(12) United States Patent
Bidgoli et al.

(10) Patent No.: US 11,394,578 B2
(45) Date of Patent: Jul. 19, 2022

(54) SUPPORTING MULTICAST OVER A NETWORK DOMAIN

(71) Applicant: Nokia Solutions and Networks Oy, Espoo (FI)

(72) Inventors: Hooman Bidgoli, Ottawa (CA); Jayant Kotalwar, Mountain View, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 197 days.

(21) Appl. No.: 16/923,380

(22) Filed: Jul. 8, 2020

(65) Prior Publication Data

US 2020/0344087 A1    Oct. 29, 2020

Related U.S. Application Data

(63) Continuation of application No. 16/024,084, filed on Jun. 29, 2018, now Pat. No. 10,764,082.

(51) Int. Cl.
*H04L 12/28* (2006.01)
*H04L 45/16* (2022.01)
*H04L 45/50* (2022.01)
*H04L 47/2483* (2022.01)

(52) U.S. Cl.
CPC .......... *H04L 12/2861* (2013.01); *H04L 45/16* (2013.01); *H04L 45/507* (2013.01); *H04L 47/2483* (2013.01)

(58) Field of Classification Search
None
See application file for complete search history.

(56) References Cited

U.S. PATENT DOCUMENTS

| 2015/0078377 A1 | 3/2015 | Wijnands |
| 2015/0078378 A1 | 3/2015 | Wijnands |

FOREIGN PATENT DOCUMENTS

| CN | 104811387 A | 7/2015 |
| CN | 105556899 A | 5/2016 |
| WO | WO2017124709 A1 | 7/2017 |

OTHER PUBLICATIONS

European Search Report dated Sep. 18, 2019 in corresponding EP Application No. 19180798.1, 6 pages.
Xie, J., et al., "Multicast VPN Using MPLS P2MP and BIER," draft-xie-bier-mvpn-mpls-p2mp-01, Network Working Group, Mar. 5, 2018, 24 pages.

(Continued)

*Primary Examiner* — James P Duffy
(74) *Attorney, Agent, or Firm* — Tong, Rea, Bentley & Kim, LLC

(57) ABSTRACT

Various example embodiments relate generally to supporting Multiprotocol Label Switching (MPLS)-based multicast over a Bit Index Explicit Replication (BIER) domain. Various example embodiments for supporting MPLS-based multicast over a BIER domain may be configured to support MPLS point-to-multipoint (P2MP) label switched paths (LSPs) over a BIER domain. Various example embodiments for supporting MPLS-based multicast over a BIER domain may be configured to support establishment and transport of P2MP LSPs over a BIER domain (e.g., signaling MPLS via the BIER domain, stitching the MPLS datapath to the BIER domain based on identification of P2MP LSPs within the BIER domain, and so forth).

24 Claims, 9 Drawing Sheets

(56) References Cited

OTHER PUBLICATIONS

Bidgoli, et al., "PIM Signaling Through BIER Core," draft-ietf-bier-pim-signaling-03, BIER Workgroup, Jun. 21, 2018, 13 pages.
Wijnands, et al., "Multicast Using Bit Index Explicit Replication (BIER)," Internet Engineering Task Force (IETF), RFC 8279, Nov. 2017, 43 pages.

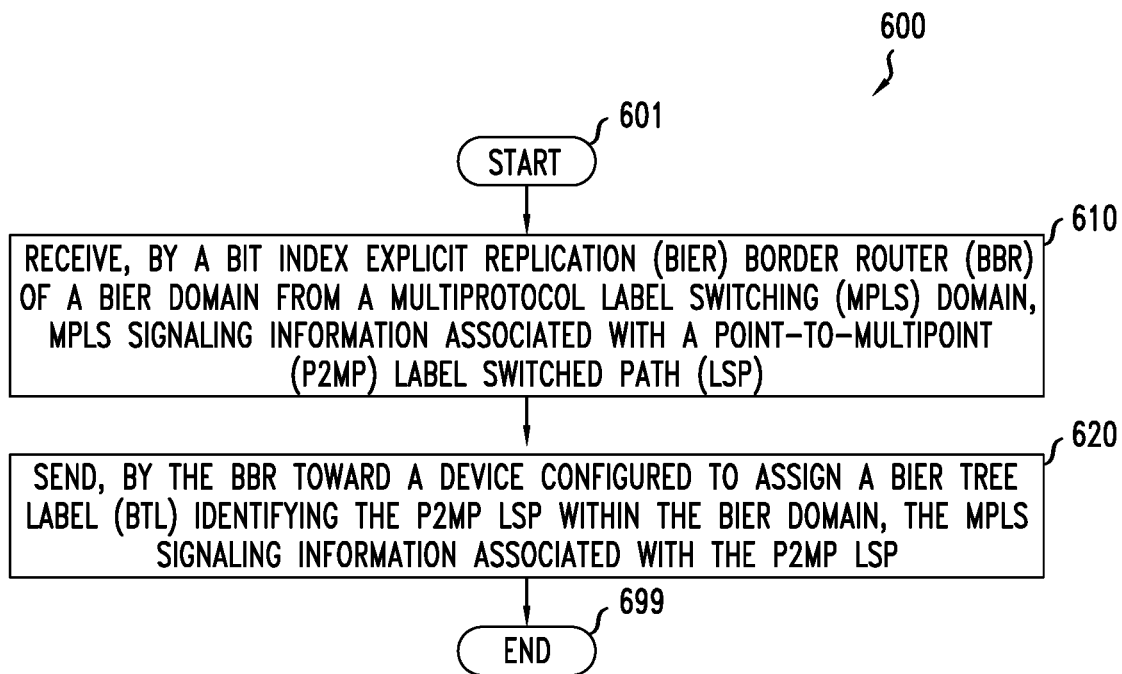
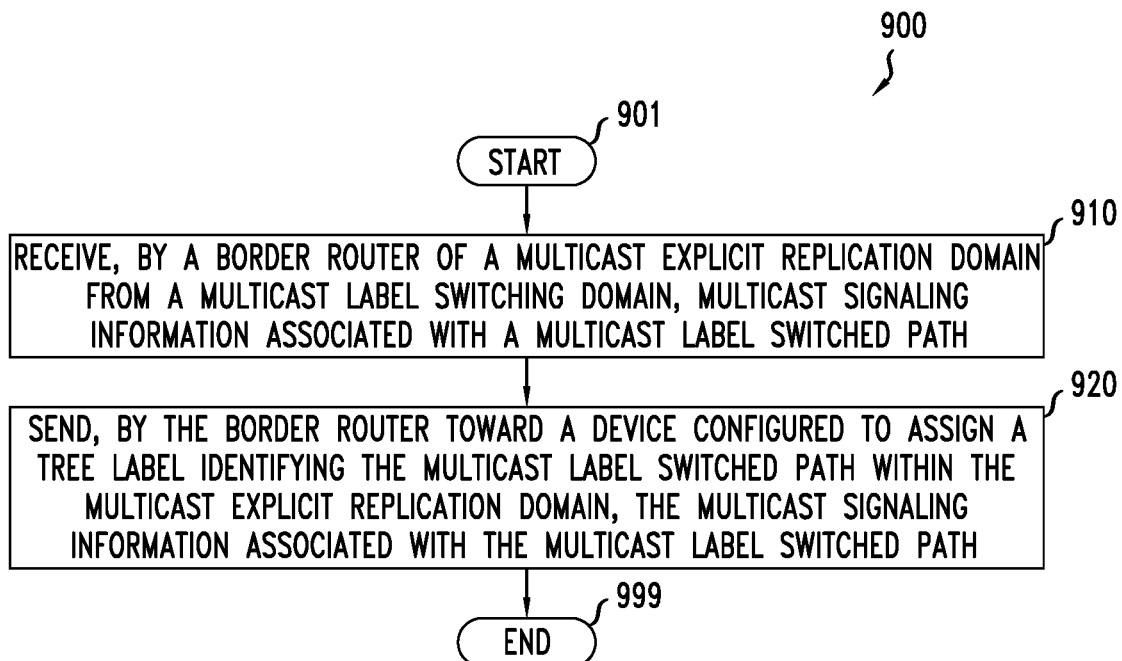

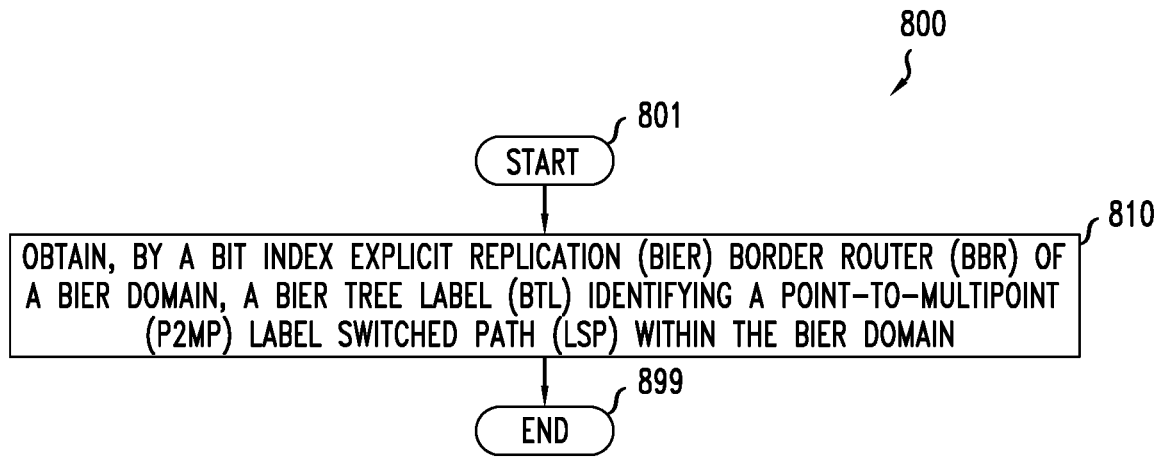
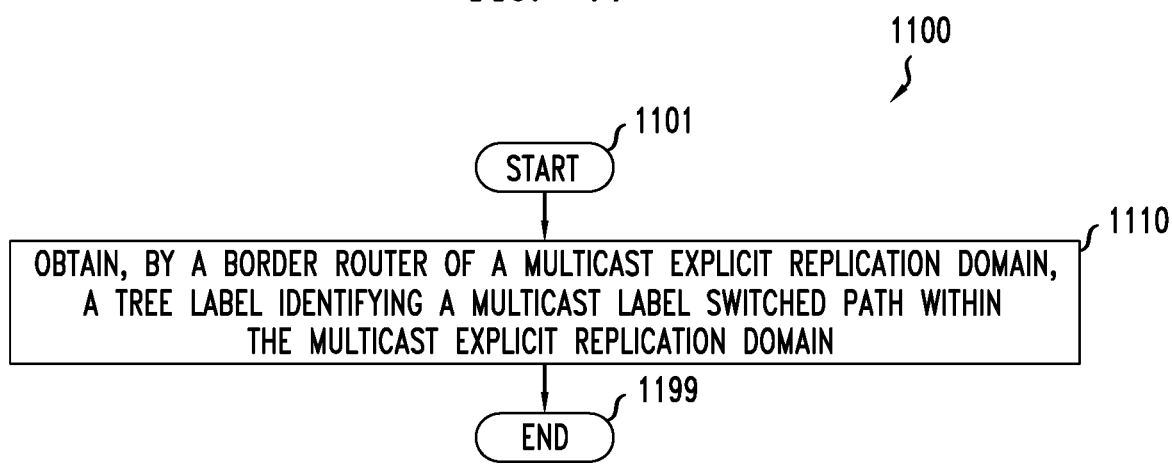

SUPPORTING MULTICAST OVER A NETWORK DOMAIN

CROSS-REFERENCE TO RELATED APPLICATIONS

This application is a continuation of U.S. patent application Ser. No. 16/024,084, filed on Jun. 29, 2018, entitled SUPPORTING MULTICAST OVER A NETWORK DOMAIN, which is hereby incorporated herein by reference.

TECHNICAL FIELD

The present disclosure relates generally to communication networks and, more particularly but not exclusively, to supporting multicast in communication networks.

BACKGROUND

Multicast is used in many types of communication networks to deliver various types of information.

SUMMARY

Various example embodiments relate generally to supporting Multiprotocol Label Switching (MPLS)-based multicast via a Bit Index Explicit Replication (BIER) domain.

In at least some example embodiments, an apparatus is provided. In at least some example embodiments, the apparatus includes at least one processor and at least one memory including computer program code, wherein the at least one memory and the computer program code are configured to, with the at least one processor, cause the apparatus to at least receive, by a BIER border router (BBR) of a BIER domain from an MPLS domain, MPLS signaling information associated with a point-to-multipoint (P2MP) label switched path (LSP) and send, by the BBR toward a device configured to assign a BIER tree label (BTL) identifying the P2MP LSP within the BIER domain, the MPLS signaling information associated with the P2MP LSP. In at least some example embodiments, the MPLS signaling information is received as Multiprotocol Label Distribution Protocol (mLDP) signaling. In at least some example embodiments, the MPLS signaling information includes a forwarding equivalence class (FEC) and an action. In at least some example embodiments, the MPLS signaling information is sent in a BIER signaling packet. In at least some example embodiments, the device configured to assign the BTL identifying the P2MP LSP within the BIER domain is a controller of the BIER domain or an egress BBR (EBBR) of the BIER domain. In at least some example embodiments, the at least one memory and the computer program code are configured to, with the at least one processor, cause the apparatus to at least determine, by the BBR, whether the root of the P2MP LSP is located across the BIER domain from the BBR. In at least some example embodiments, the at least one memory and the computer program code are configured to, with the at least one processor, cause the apparatus to at least receive, by the BBR from the device configured to assign the BTL identifying the P2MP LSP within the BIER domain, the BTL identifying the P2MP LSP within the BIER domain and configure, by the BBR based on the BTL identifying the P2MP LSP within the BIER domain, an entry indicative of handling of packets of the P2MP LSP within the MPLS domain. In at least some example embodiments, the entry indicative of handling of packets of the P2MP LSP within the MPLS domain includes an indication of an MPLS label identifying the P2MP LSP within the MPLS domain. In at least some example embodiments, the at least one memory and the computer program code are configured to, with the at least one processor, cause the apparatus to at least receive, by the BBR via the BIER domain, a packet of the P2MP LSP that includes the BTL identifying the P2MP LSP within the BIER domain, modify, by the BBR, the packet of the P2MP LSP to replace the BTL identifying the P2MP LSP within the BIER domain with an MPLS label identifying the P2MP LSP within the MPLS domain to provide a modified packet, and send, by the BBR via the MPLS domain, the modified packet. In at least some example embodiments, an apparatus includes at least one processor and at least one memory including computer program code, wherein the at least one memory and the computer program code are configured to, with the at least one processor, cause the apparatus to at least receive, by a border router of a multicast explicit replication domain from a multicast label switching domain, multicast signaling information associated with a multicast label switched path and send, by the border router toward a device configured to assign a tree label identifying the multicast label switched path within the multicast explicit replication domain, the multicast signaling information associated with the multicast label switched path.

In at least some example embodiments, a method is provided. In at least some example embodiments, the method includes receiving, by a BIER border router (BBR) of a BIER domain from an MPLS domain, MPLS signaling information associated with a point-to-multipoint (P2MP) label switched path (LSP) and sending, by the BBR toward a device configured to assign a BIER tree label (BTL) identifying the P2MP LSP within the BIER domain, the MPLS signaling information associated with the P2MP LSP. In at least some example embodiments, the MPLS signaling information is received as Multiprotocol Label Distribution Protocol (mLDP) signaling. In at least some example embodiments, the MPLS signaling information includes a forwarding equivalence class (FEC) and an action. In at least some example embodiments, the MPLS signaling information is sent in a BIER signaling packet. In at least some example embodiments, the device configured to assign the BTL identifying the P2MP LSP within the BIER domain is a controller of the BIER domain or an egress BBR (EBBR) of the BIER domain. In at least some example embodiments, the method includes determining, by the BBR, whether the root of the P2MP LSP is located across the BIER domain from the BBR. In at least some example embodiments, the method includes receiving, by the BBR from the device configured to assign the BTL identifying the P2MP LSP within the BIER domain, the BTL identifying the P2MP LSP within the BIER domain and configuring, by the BBR based on the BTL identifying the P2MP LSP within the BIER domain, an entry indicative of handling of packets of the P2MP LSP within the MPLS domain. In at least some example embodiments, the entry indicative of handling of packets of the P2MP LSP within the MPLS domain includes an indication of an MPLS label identifying the P2MP LSP within the MPLS domain. In at least some example embodiments, the method includes receiving, by the BBR via the BIER domain, a packet of the P2MP LSP that includes the BTL identifying the P2MP LSP within the BIER domain, modifying, by the BBR, the packet of the P2MP LSP to replace the BTL identifying the P2MP LSP within the BIER domain with an MPLS label identifying the P2MP LSP within the MPLS domain to provide a modified packet, and sending, by the BBR via the MPLS domain, the modified packet. In at least some example embodiments, a method includes receiving, by a border router of a multicast explicit replication domain from a multicast label switching domain, multicast signaling information associated with a multicast label switched path and sending, by the border router toward a device configured to assign a tree label identifying the multicast label switched path within the multicast explicit replication domain, the multicast signaling information associated with the multicast label switched path.

In at least some example embodiments, a non-transitory computer readable medium is provided. In at least some example embodiments, the non-transitory computer-readable medium includes program instructions for causing an apparatus to at least receive, by a BIER border router (BBR) of a BIER domain from an MPLS domain, MPLS signaling information associated with a point-to-multipoint (P2MP) label switched path (LSP) and send, by the BBR toward a device configured to assign a BIER tree label (BTL) identifying the P2MP LSP within the BIER domain, the MPLS signaling information associated with the P2MP LSP. In at least some example embodiments, the MPLS signaling information is received as Multiprotocol Label Distribution Protocol (mLDP) signaling. In at least some example embodiments, the MPLS signaling information includes a forwarding equivalence class (FEC) and an action. In at least some example embodiments, the MPLS signaling information is sent in a BIER signaling packet. In at least some example embodiments, the device configured to assign the BTL identifying the P2MP LSP within the BIER domain is a controller of the BIER domain or an egress BBR (EBBR) of the BIER domain. In at least some example embodiments, the non-transitory computer-readable medium includes program instructions for causing the apparatus to at least determine, by the BBR, whether the root of the P2MP LSP is located across the BIER domain from the BBR. In at least some example embodiments, the non-transitory computer-readable medium includes program instructions for causing the apparatus to at least receive, by the BBR from the device configured to assign the BTL identifying the P2MP LSP within the BIER domain, the BTL identifying the P2MP LSP within the BIER domain and configure, by the BBR based on the BTL identifying the P2MP LSP within the BIER domain, an entry indicative of handling of packets of the P2MP LSP within the MPLS domain. In at least some example embodiments, the entry indicative of handling of packets of the P2MP LSP within the MPLS domain includes an indication of an MPLS label identifying the P2MP LSP within the MPLS domain. In at least some example embodiments, the non-transitory computer-readable medium includes program instructions for causing the apparatus to at least receive, by the BBR via the BIER domain, a packet of the P2MP LSP that includes the BTL identifying the P2MP LSP within the BIER domain, modify, by the BBR, the packet of the P2MP LSP to replace the BTL identifying the P2MP LSP within the BIER domain with an MPLS label identifying the P2MP LSP within the MPLS domain to provide a modified packet, and send, by the BBR via the MPLS domain, the modified packet. In a non-transitory computer-readable medium includes program instructions for causing an apparatus to at least receive, by a border router of a multicast explicit replication domain from a multicast label switching domain, multicast signaling information associated with a multicast label switched path and send, by the border router toward a device configured to assign a tree label identifying the multicast label switched path within the multicast explicit replication domain, the multicast signaling information associated with the multicast label switched path.

In at least some example embodiments, an apparatus is provided. In at least some example embodiments, the apparatus includes means for receiving, by a BIER border router (BBR) of a BIER domain from an MPLS domain, MPLS signaling information associated with a point-to-multipoint (P2MP) label switched path (LSP) and means for sending, by the BBR toward a device configured to assign a BIER tree label (BTL) identifying the P2MP LSP within the BIER domain, the MPLS signaling information associated with the P2MP LSP. In at least some example embodiments, the MPLS signaling information is received as Multiprotocol Label Distribution Protocol (mLDP) signaling. In at least some example embodiments, the MPLS signaling information includes a forwarding equivalence class (FEC) and an action. In at least some example embodiments, the MPLS signaling information is sent in a BIER signaling packet. In at least some example embodiments, the device configured to assign the BTL identifying the P2MP LSP within the BIER domain is a controller of the BIER domain or an egress BBR (EBBR) of the BIER domain. In at least some example embodiments, the apparatus includes means for determining, by the BBR, whether the root of the P2MP LSP is located across the BIER domain from the BBR. In at least some example embodiments, the apparatus includes means for receiving, by the BBR from the device configured to assign the BTL identifying the P2MP LSP within the BIER domain, the BTL identifying the P2MP LSP within the BIER domain and means for configuring, by the BBR based on the BTL identifying the P2MP LSP within the BIER domain, an entry indicative of handling of packets of the P2MP LSP within the MPLS domain. In at least some example embodiments, the entry indicative of handling of packets of the P2MP LSP within the MPLS domain includes an indication of an MPLS label identifying the P2MP LSP within the MPLS domain. In at least some example embodiments, the apparatus includes means for receiving, by the BBR via the BIER domain, a packet of the P2MP LSP that includes the BTL identifying the P2MP LSP within the BIER domain, means for modifying, by the BBR, the packet of the P2MP LSP to replace the BTL identifying the P2MP LSP within the BIER domain with an MPLS label identifying the P2MP LSP within the MPLS domain to provide a modified packet, and means for sending, by the BBR via the MPLS domain, the modified packet. In at least some example embodiments, an apparatus includes means for receiving, by a border router of a multicast explicit replication domain from a multicast label switching domain, multicast signaling information associated with a multicast label switched path and means for sending, by the border router toward a device configured to assign a tree label identifying the multicast label switched path within the multicast explicit replication domain, the multicast signaling information associated with the multicast label switched path.

In at least some example embodiments, an apparatus is provided. In at least some example embodiments, the apparatus includes at least one processor and at least one memory including computer program code, wherein the at least one memory and the computer program code are configured to, with the at least one processor, cause the apparatus to at least receive, by a device associated with a BIER domain, MPLS signaling information associated with a point-to-multipoint (P2MP) label switched path (LSP) and assign, by the device based on the MPLS signaling information associated with the P2MP LSP, a BIER tree label (BTL) identifying the P2MP LSP within the BIER domain. In at least some example embodiments, the MPLS signaling information is received from an ingress BIER border router (IBBR) of the BIER domain. In at least some example embodiments, the MPLS signaling information is received in a BIER signaling packet. In at least some example embodiments, the MPLS signaling information includes a forwarding equivalence class (FEC) and an action. In at least some example embodiments, the device associated with the BIER domain is a controller of the BIER domain or an egress BIER border router (EBBR) of the BIER domain for the P2MP LSP. In at least some example embodiments, the device associated with the BIER domain is a controller of the BIER domain. In at least some example embodiments, the at least one memory and the computer program code are configured to, with the at least one processor, cause the apparatus to at least send, from the device toward one or more BIER border routers (BBRs) interested in the P2MP LSP, the BTL identifying the P2MP LSP within the BIER domain. In at least some example embodiments, the one or more BBRs interested in the P2MP LSP include an ingress BBR (IBBR) from which the MPLS signaling information is received and an egress BBR (EBBR) of the BIER domain for the P2MP LSP. In at least some example embodiments, the device associated with the BIER domain is an egress BIER border router (EBBR) of the BIER domain for the P2MP LSP. In at least some example embodiments, the at least one memory and the computer program code are configured to, with the at least one processor, cause the apparatus to at least send, from the device toward a controller of the BIER domain, the BTL identifying the P2MP LSP within the BIER domain. In at least some example embodiments, the at least one memory and the computer program code are configured to, with the at least one processor, cause the apparatus to at least assign, by the device, an MPLS label identifying the P2MP LSP within an MPLS domain and send, by the device toward a root of the P2MP LSP via the MPLS domain, the MPLS label identifying the P2MP LSP within the MPLS domain. In at least some example embodiments, an apparatus includes at least one processor and at least one memory including computer program code, wherein the at least one memory and the computer program code are configured to, with the at least one processor, cause the apparatus to at least receive, by a device associated with a multicast explicit replication domain, multicast signaling information associated with a multicast label switched path and assign, by the device based on the multicast signaling information associated with the multicast label switched path, a tree label identifying the multicast label switched path within the multicast explicit replication domain.

In at least some example embodiments, a method is provided. In at least some example embodiments, the method includes receiving, by a device associated with a BIER domain, MPLS signaling information associated with a point-to-multipoint (P2MP) label switched path (LSP) and assigning, by the device based on the MPLS signaling information associated with the P2MP LSP, a BIER tree label (BTL) identifying the P2MP LSP within the BIER domain. In at least some example embodiments, the MPLS signaling information is received from an ingress BIER border router (IBBR) of the BIER domain. In at least some example embodiments, the MPLS signaling information is received in a BIER signaling packet. In at least some example embodiments, the MPLS signaling information includes a forwarding equivalence class (FEC) and an action. In at least some example embodiments, the device associated with the BIER domain is a controller of the BIER domain or an egress BIER border router (EBBR) of the BIER domain for the P2MP LSP. In at least some example embodiments, the device associated with the BIER domain is a controller of the BIER domain. In at least some example embodiments, the method includes sending, from the device toward one or more BIER border routers (BBRs) interested in the P2MP LSP, the BTL identifying the P2MP LSP within the BIER domain. In at least some example embodiments, the one or more BBRs interested in the P2MP LSP include an ingress BBR (IBBR) from which the MPLS signaling information is received and an egress BBR (EBBR) of the BIER domain for the P2MP LSP. In at least some example embodiments, the device associated with the BIER domain is an egress BIER border router (EBBR) of the BIER domain for the P2MP LSP. In at least some example embodiments, the method includes sending, from the device toward a controller of the BIER domain, the BTL identifying the P2MP LSP within the BIER domain. In at least some example embodiments, the method includes assigning, by the device, an MPLS label identifying the P2MP LSP within an MPLS domain and sending, by the device toward a root of the P2MP LSP via the MPLS domain, the MPLS label identifying the P2MP LSP within the MPLS domain. In at least some example embodiments, a method includes receiving, by a device associated with a multicast explicit replication domain, multicast signaling information associated with a multicast label switched path and assigning, by the device based on the multicast signaling information associated with the multicast label switched path, a tree label identifying the multicast label switched path within the multicast explicit replication domain.

In at least some example embodiments, a non-transitory computer readable medium is provided. In at least some example embodiments, the non-transitory computer-readable medium includes program instructions for causing an apparatus to at least receive, by a device associated with a BIER domain, MPLS signaling information associated with a point-to-multipoint (P2MP) label switched path (LSP) and assign, by the device based on the MPLS signaling information associated with the P2MP LSP, a BIER tree label (BTL) identifying the P2MP LSP within the BIER domain. In at least some example embodiments, the MPLS signaling information is received from an ingress BIER border router (IBBR) of the BIER domain. In at least some example embodiments, the MPLS signaling information is received in a BIER signaling packet. In at least some example embodiments, the MPLS signaling information includes a forwarding equivalence class (FEC) and an action. In at least some example embodiments, the device associated with the BIER domain is a controller of the BIER domain or an egress BIER border router (EBBR) of the BIER domain for the P2MP LSP. In at least some example embodiments, the device associated with the BIER domain is a controller of the BIER domain. In at least some example embodiments, the non-transitory computer-readable medium includes program instructions for causing the apparatus to at least send, from the device toward one or more BIER border routers (BBRs) interested in the P2MP LSP, the BTL identifying the P2MP LSP within the BIER domain. In at least some example embodiments, the one or more BBRs interested in the P2MP LSP include an ingress BBR (IBBR) from which the MPLS signaling information is received and an egress BBR (EBBR) of the BIER domain for the P2MP LSP. In at least some example embodiments, the device associated with the BIER domain is an egress BIER border router (EBBR) of the BIER domain for the P2MP LSP. In at least some example embodiments, the non-transitory computer-readable medium includes program instructions for causing the apparatus to at least send, from the device toward a controller of the BIER domain, the BTL identifying the P2MP LSP within the BIER domain. In at least some example embodiments, the non-transitory computer-readable medium includes program instructions for causing the apparatus to at least assign, by the device, an MPLS label identifying the P2MP LSP within an MPLS domain and send, by the device toward a root of the P2MP LSP via the MPLS domain, the MPLS label identifying the P2MP LSP within the MPLS domain. In at least some example embodiments, a non-transitory computer-readable medium includes program instructions for causing an apparatus to at least receive, by a device associated with a multicast explicit replication domain, multicast signaling information associated with a multicast label switched path and assign, by the device based on the multicast signaling information associated with the multicast label switched path, a tree label identifying the multicast label switched path within the multicast explicit replication domain.

In at least some example embodiments, an apparatus is provided. In at least some example embodiments, the apparatus includes means for receiving, by a device associated with a BIER domain, MPLS signaling information associated with a point-to-multipoint (P2MP) label switched path (LSP) and means for assigning, by the device based on the MPLS signaling information associated with the P2MP LSP, a BIER tree label (BTL) identifying the P2MP LSP within the BIER domain. In at least some example embodiments, the MPLS signaling information is received from an ingress BIER border router (IBBR) of the BIER domain. In at least some example embodiments, the MPLS signaling information is received in a BIER signaling packet. In at least some example embodiments, the MPLS signaling information includes a forwarding equivalence class (FEC) and an action. In at least some example embodiments, the device associated with the BIER domain is a controller of the BIER domain or an egress BIER border router (EBBR) of the BIER domain for the P2MP LSP. In at least some example embodiments, the device associated with the BIER domain is a controller of the BIER domain. In at least some example embodiments, the apparatus includes means for sending, from the device toward one or more BIER border routers (BBRs) interested in the P2MP LSP, the BTL identifying the P2MP LSP within the BIER domain. In at least some example embodiments, the one or more BBRs interested in the P2MP LSP include an ingress BBR (IBBR) from which the MPLS signaling information is received and an egress BBR (EBBR) of the BIER domain for the P2MP LSP. In at least some example embodiments, the device associated with the BIER domain is an egress BIER border router (EBBR) of the BIER domain for the P2MP LSP. In at least some example embodiments, the apparatus includes means for sending, from the device toward a controller of the BIER domain, the BTL identifying the P2MP LSP within the BIER domain. In at least some example embodiments, the apparatus includes means for assigning, by the device, an MPLS label identifying the P2MP LSP within an MPLS domain and means for sending, by the device toward a root of the P2MP LSP via the MPLS domain, the MPLS label identifying the P2MP LSP within the MPLS domain. In at least some example embodiments, an apparatus includes means for receiving, by a device associated with a multicast explicit replication domain, multicast signaling information associated with a multicast label switched path and means for assigning, by the device based on the multicast signaling information associated with the multicast label switched path, a tree label identifying the multicast label switched path within the multicast explicit replication domain.

In at least some example embodiments, an apparatus is provided. In at least some example embodiments, the apparatus includes at least one processor and at least one memory including computer program code, wherein the at least one memory and the computer program code are configured to, with the at least one processor, cause the apparatus to at least obtain, by a BIER border router (BBR) of a BIER domain, a BIER tree label (BTL) identifying a point-to-multipoint (P2MP) label switched path (LSP) within the BIER domain. In at least some example embodiments, to obtain BTL identifying the P2MP LSP within the BIER domain, the at least one memory and the computer program code are configured to, with the at least one processor, cause the apparatus to at least receive, by the device from a controller of the BIER domain, the BTL identifying the P2MP LSP within the BIER domain. In at least some example embodiments, to obtain the BTL identifying the P2MP LSP within the BIER domain, the at least one memory and the computer program code are configured to, with the at least one processor, cause the apparatus to at least receive, by the device from an ingress BBR of the BIER domain, MPLS signaling information including a forwarding equivalence class (FEC) associated with the P2MP LSP and assign, by the device based on the FEC associated with the P2MP LSP, the BTL identifying the P2MP LSP within the BIER domain. In at least some example embodiments, the FEC associated with the P2MP LSP is received in a BIER signaling packet. In at least some example embodiments, the at least one memory and the computer program code are configured to, with the at least one processor, cause the apparatus to at least send, by the device toward a controller of the BIER domain, the BTL identifying the P2MP LSP within the BIER domain. In at least some example embodiments, the at least one memory and the computer program code are configured to, with the at least one processor, cause the apparatus to at least send, by the device toward the IBBR of the BIER domain, the BTL identifying the P2MP LSP within the BIER domain. In at least some example embodiments, the BTL identifying the P2MP LSP within the BIER domain is sent based on at least one of a Multiprotocol-Border Gateway Protocol (MP-BGP) adjacency, a BGP Multicast Virtual Private Network (MVPN), or Segment Routing-Traffic Engineering (SR-TE). In at least some example embodiments, an apparatus includes at least one processor and at least one memory including computer program code, wherein the at least one memory and the computer program code are configured to, with the at least one processor, cause the apparatus to at least obtain, by a border router of a multicast explicit replication domain, a tree label identifying a multicast label switched path within the multicast explicit replication domain.

In at least some example embodiments, a method is provided. In at least some example embodiments, the method includes obtaining, by a BIER border router (BBR) of a BIER domain, a BIER tree label (BTL) identifying a point-to-multipoint (P2MP) label switched path (LSP) within the BIER domain. In at least some example embodiments, obtaining the BTL identifying the P2MP LSP within the BIER domain includes receiving, by the device from a controller of the BIER domain, the BTL identifying the P2MP LSP within the BIER domain. In at least some example embodiments, obtaining the BTL identifying the P2MP LSP within the BIER domain includes receiving, by the device from an ingress BBR of the BIER domain, MPLS signaling information including a forwarding equivalence class (FEC) associated with the P2MP LSP and assigning, by the device based on the FEC associated with the P2MP LSP, the BTL identifying the P2MP LSP within the BIER domain. In at least some example embodiments, the FEC associated with the P2MP LSP is received in a BIER signaling packet. In at least some example embodiments, the method includes sending, by the device toward a controller of the BIER domain, the BTL identifying the P2MP LSP within the BIER domain. In at least some example embodiments, the method includes sending, by the device toward the IBBR of the BIER domain, the BTL identifying the P2MP LSP within the BIER domain. In at least some example embodiments, the BTL identifying the P2MP LSP within the BIER domain is sent based on at least one of a Multiprotocol-Border Gateway Protocol (MP-BGP) adjacency, a BGP Multicast Virtual Private Network (MVPN), or Segment Routing-Traffic Engineering (SR-TE). In at least some example embodiments, a method includes obtaining, by a border router of a multicast explicit replication domain, a tree label identifying a multicast label switched path within the multicast explicit replication domain.

In at least some example embodiments, a non-transitory computer readable medium is provided. In at least some example embodiments, the non-transitory computer-readable medium includes program instructions for causing an apparatus to at least obtain, by a BIER border router (BBR) of a BIER domain, a BIER tree label (BTL) identifying a point-to-multipoint (P2MP) label switched path (LSP) within the BIER domain. In at least some example embodiments, to obtain BTL identifying the P2MP LSP within the BIER domain, the non-transitory computer-readable medium includes program instructions for causing the apparatus to at least receive, by the device from a controller of the BIER domain, the BTL identifying the P2MP LSP within the BIER domain. In at least some example embodiments, to obtain the BTL identifying the P2MP LSP within the BIER domain, the non-transitory computer-readable medium includes program instructions for causing the apparatus to at least receive, by the device from an ingress BBR of the BIER domain, MPLS signaling information including a forwarding equivalence class (FEC) associated with the P2MP LSP and assign, by the device based on the FEC associated with the P2MP LSP, the BTL identifying the P2MP LSP within the BIER domain. In at least some example embodiments, the FEC associated with the P2MP LSP is received in a BIER signaling packet. In at least some example embodiments, the non-transitory computer-readable medium includes program instructions for causing the apparatus to at least send, by the device toward a controller of the BIER domain, the BTL identifying the P2MP LSP within the BIER domain. In at least some example embodiments, the non-transitory computer-readable medium includes program instructions for causing the apparatus to at least send, by the device toward the IBBR of the BIER domain, the BTL identifying the P2MP LSP within the BIER domain. In at least some example embodiments, the BTL identifying the P2MP LSP within the BIER domain is sent based on at least one of a Multiprotocol-Border Gateway Protocol (MP-BGP) adjacency, a BGP Multicast Virtual Private Network (MVPN), or Segment Routing-Traffic Engineering (SR-TE). In at least some example embodiments, a non-transitory computer-readable medium includes program instructions for causing an apparatus to at least obtain, by a border router of a multicast explicit replication domain, a tree label identifying a multicast label switched path within the multicast explicit replication domain.

In at least some example embodiments, an apparatus is provided. In at least some example embodiments, the apparatus includes means for obtaining, by a BIER border router (BBR) of a BIER domain, a BIER tree label (BTL) identifying a point-to-multipoint (P2MP) label switched path (LSP) within the BIER domain. In at least some example embodiments, the means for obtaining the BTL identifying the P2MP LSP within the BIER domain includes means for receiving, by the device from a controller of the BIER domain, the BTL identifying the P2MP LSP within the BIER domain. In at least some example embodiments, the means for obtaining the BTL identifying the P2MP LSP within the BIER domain includes means for receiving, by the device from an ingress BBR of the BIER domain, MPLS signaling information including a forwarding equivalence class (FEC) associated with the P2MP LSP and means for assigning, by the device based on the FEC associated with the P2MP LSP, the BTL identifying the P2MP LSP within the BIER domain. In at least some example embodiments, the FEC associated with the P2MP LSP is received in a BIER signaling packet. In at least some example embodiments, the apparatus includes means for sending, by the device toward a controller of the BIER domain, the BTL identifying the P2MP LSP within the BIER domain. In at least some example embodiments, the apparatus includes means for sending, by the device toward the IBBR of the BIER domain, the BTL identifying the P2MP LSP within the BIER domain. In at least some example embodiments, the BTL identifying the P2MP LSP within the BIER domain is sent based on at least one of a Multiprotocol-Border Gateway Protocol (MP-BGP) adjacency, a BGP Multicast Virtual Private Network (MVPN), or Segment Routing-Traffic Engineering (SR-TE). In at least some example embodiments, an apparatus includes means for obtaining, by a border router of a multicast explicit replication domain, a tree label identifying a multicast label switched path within the multicast explicit replication domain.

BRIEF DESCRIPTION OF THE DRAWINGS

The teachings herein can be readily understood by considering the following detailed description in conjunction with the accompanying drawings, in which:

FIG. 6 depicts an example embodiment of a method for use by an IBBR for supporting assignment of a label to a P2MP LSP within a BIER domain for uniquely identifying the P2MP LSP within the BIER domain;

FIG. 8 depicts an example embodiment of a method for use by an EBBR for supporting assignment of a label to a P2MP LSP within a BIER domain for uniquely identifying the P2MP LSP within the BIER domain;

FIG. 9 depicts an example embodiment of a method for use by border router of a multicast explicit replication domain for supporting assignment of a label to a multicast label switched path within the multicast explicit replication domain for uniquely identifying the multicast label switched path within the multicast explicit replication domain;

FIG. 11 depicts an example embodiment of a method for use by a border router of a multicast explicit replication domain for supporting assignment of a label to a multicast label switched path within the multicast explicit replication domain for uniquely identifying the multicast label switched path within the multicast explicit replication domain.

To facilitate understanding, identical reference numerals have been used, where possible, to designate identical elements that are common to the figures.

DETAILED DESCRIPTION

Various example embodiments relate generally to supporting Multiprotocol Label Switching (MPLS)-based multicast over a Bit Index Explicit Replication (BIER) domain. Various example embodiments for supporting MPLS-based multicast over a BIER domain may be configured to support MPLS point-to-multipoint (P2MP) label switched paths (LSPs) over a BIER domain. Various example embodiments for supporting MPLS-based multicast over a BIER domain may be configured to support establishment and transport of P2MP LSPs over a BIER domain (e.g., signaling MPLS via the BIER domain, stitching the MPLS datapath to the BIER domain based on identification of P2MP LSPs within the BIER domain, and so forth). Various example embodiments for supporting MPLS-based multicast over a BIER domain may be configured to support signaling of MPLS via the BIER domain based on termination of MPLS signaling at the edge of the BIER domain and forwarding of MPLS signaling information from the MPLS signaling within the BIER domain (e.g., Multicast Label Distribution Protocol (mLDP) signaling). Various example embodiments for supporting MPLS-based multicast over a BIER domain may be configured to support stitching the MPLS datapath to the BIER domain based on identification of P2MP LSPs within the BIER domain using BIER tree labels (BTLs) that uniquely identify the P2MP LSPs (and, thus, are associated with the forwarding equivalence classes (FECs) for the P2MP LSPs) within the BIER domain, respectively. Various example embodiments for supporting MPLS-based multicast over a BIER domain may be configured to support assignment of a BTL for a P2MP LSP within the BIER domain, which uniquely identifies the P2MP LSP within the BIER domain, by a controller of the associated BIER domain (e.g., a Software Defined Networking (SDN) controller or other suitable type of controller), by a BIER border router of the associated BIER domain (e.g., a BIER border router on the P2MP LSP, such as by a BIER border router that is an ingress point into the BIER domain for multicast data traffic of the P2MP LSP), or the like, as well as various combinations thereof. It will be appreciated that these and various other embodiments and potential advantages for supporting stitching of P2MP LSPs via a BIER domain may be further understood by way of reference to the example communication system of FIG. 1.

Figure 1:
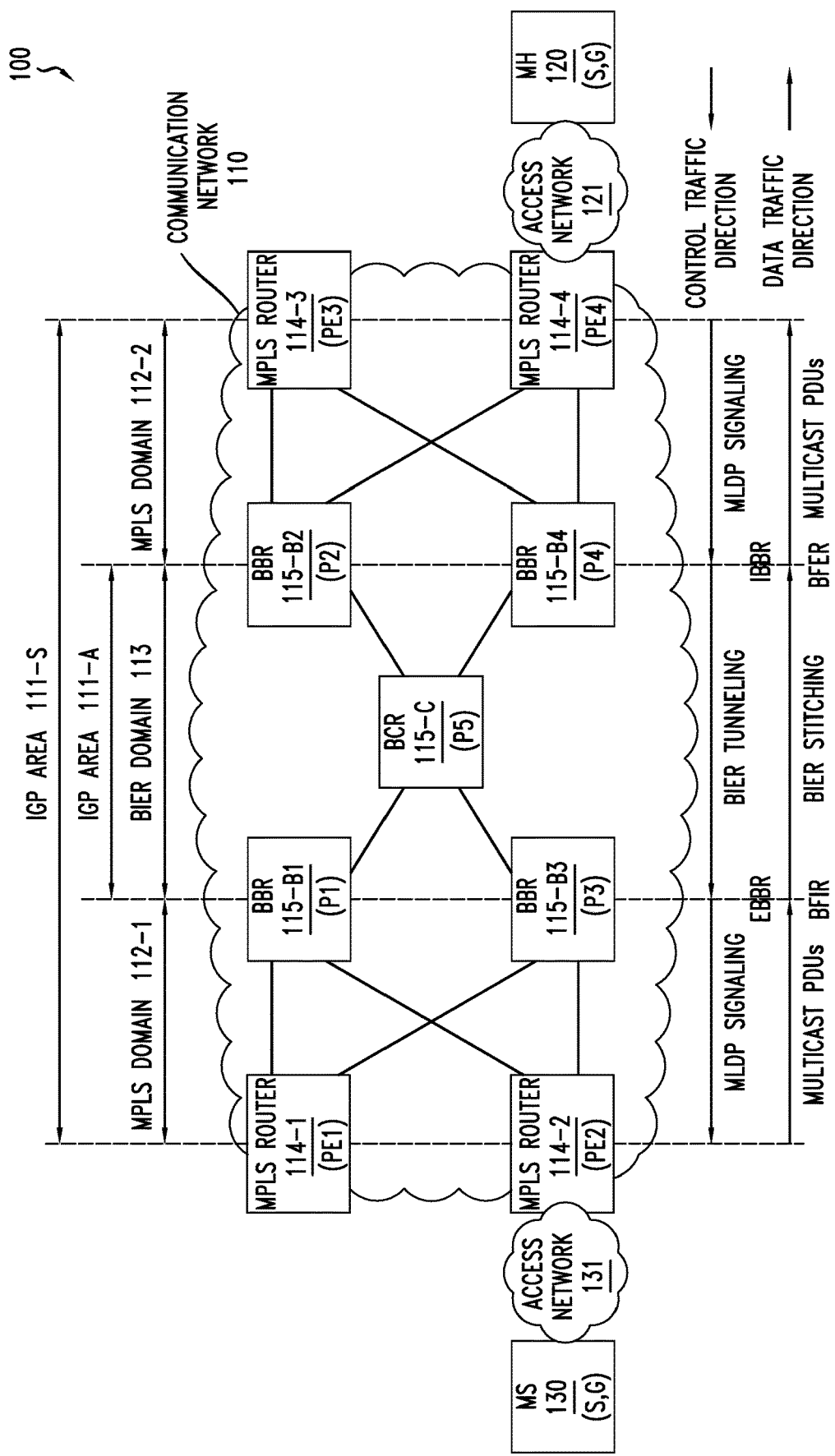
FIG. 1 depicts a communication system configured to support a P2MP LSP via a BIER domain based on assignment of a label in the BIER domain that uniquely identifies P2MP LSP within the BIER domain.

FIG. 1 depicts a communication system configured to support a P2MP LSP via a BIER domain based on assignment of a label in the BIER domain that uniquely identifies P2MP LSP within the BIER domain.

The communication system 100 includes a communication network (CN) 110 that is configured to support multicasting of traffic to a multicast host (MH) 120 from a multicast source (MS) 130.

The communication system 100 illustrates an arrangement in which multicast control traffic is propagated from right to left on the page (e.g., from the MH 120 toward the MS 130, via the CN 110, for enabling the MH 120 to join and leave multicast services) and in which multicast traffic is propagated from left to right on the page (e.g., from the MS 130 toward the MH 120, via the CN 110, for enabling the MH 120 to receive multicast data traffic).

The CN 110 is composed of an Interior Gateway Protocol (IGP) area (which, illustratively, may be IGP area 111-A or IGP area 111-S), a pair of MPLS domains 112-1 and 112-2 (collectively, MPLS domains 112), and a BIER domain 113. In at least some embodiments, the IGP area and the BIER domain 113 are commensurate in scope as the entire IGP area is implemented using BIER (illustrated in FIG. 1 using the IGP area 111-A indicator). In at least some embodiments, the IGP area and the BIER domain 113 are not commensurate in scope as only a portion of the IGP area is implemented using BIER (illustrated in FIG. 1 using the IGP area 111-S indicator, which illustrates that the BIER domain 113 is actually a BIER sub-domain that is only part of the IGP area 111-S). It will be appreciated that certain aspects of supporting multicast within the CN 110 may vary depending on whether the BIER domain 113 forms all or part of the IGP area.

The CN 110 includes a set of MPLS routers 114-1-114-4 (collectively, MPLS routers 114) operating within the MPLS domains 112 and a set of BIER routers 115 operating within the BIER domain 113. The set of BIER routers 115 includes a set of BIER border routers (BBRs) 115-B1-115-B4 (collectively, BBRs 115-B) and a BIER core router (BCR) 115-C. The MPLS routers 114-1 and 114-2 (operating in the MPLS domain 112-1) are each connected to the BBRs 115-B1 and 115-B3 and the MPLS routers 114-3 and 114-4 (operating in the MPLS domain 112-2) are each connected to the BBRs 115-B2 and 115-B4. The BBRs 115-B are each connected to the BCR 115-C. The MH 120 is communicatively connected to MPLS router 114-4 via an access network 121 and the MS 130 is communicatively connected to the MPLS router 114-2 via an access network 131.

The MPLS routers 114 are configured to facilitate communication between multicast endpoints (e.g., MS 130 and MH 120) and the BBRs 115-B of the BIER domain 113. The MPLS routers 114 are configured to support communication of multicast control traffic in the control traffic direction based on multicast control protocols and communication of multicast data traffic in the data traffic direction based on multicast data protocols.

The MPLS routers 114 are configured to support communications with multicast endpoints, including multicast hosts (e.g., the MH 120) and multicast sources (e.g., the MS 130). The MPLS routers 114 are configured to support multicast control communications with multicast hosts and multicast sources using various multicast control protocols (e.g., Label Distribution Protocol (LDP), Multicast LDP (mLDP), or the like). For example, MPLS router 114-4 may receive multicast control protocol signaling from the MH 120 for enabling the MH 120 to join or leave a multicast group supported by MS 130 and, similarly, MS 130 may receive multicast control protocol signaling from the MPLS router 114-2 for enabling the MH 120 to join or leave a multicast group supported by MS 130. The MPLS routers 114 are configured to support multicast data communications with multicast sources and multicast sources using various data transport protocols (e.g., MPLS or the like). For example, MPLS router 114-2 may receive multicast data traffic from the MS 130 and MPLS router 114-4 may send multicast data traffic to the MH 120. The MPLS routers 114 may be configured to support multicast control and data communications with multicast hosts and multicast sources based on various other types of protocols.

The MPLS routers 114 are configured to support communications with BBRs 115-B. The MPLS routers 114 are configured to support multicast control communications with BBRs 115-B using various multicast control protocols (e.g., LDP, mLDP, or the like). For example, MPLS router 114-4 may send multicast control protocol signaling received from the MH 120 (e.g., for enabling the MH 120 to join or leave a multicast group supported by MS 130) to BBR 115-B2 or BBR 115-B4 and, similarly, MPLS router 114-2 may receive multicast control protocol signal intended for MS 130 (e.g., for enabling the MH 120 to join or leave a multicast group supported by MS 130) from BBR 115-1 or BBR 115-3. The MPLS routers 114 are configured to support multicast data communications with BBRs 115-B using various multicast data protocols (e.g., MPLS or the like). For example, the MPLS router 114-2 may receive multicast data traffic from the MS 130 and send the multicast data to BBR 115-B1 or BBR 115-B3 and, similarly, MPLS router 114-4 may receive multicast data traffic from BBR 115-B2 or BBR 115-B4 and send the multicast data to the MH 120. The communication of multicast data traffic between the MPLS routers 114 and the BBRs 115-B may be based on MPLS P2MP LSPs or other types of multicast data communication mechanisms. The MPLS routers 114 may be configured to support various other types of communications with BBRs 115-B.

The BIER routers 115 are configured to support BIER, an architecture that, in general, provides multicast forwarding through a BIER domain (illustratively, BIER domain 113) without requiring intermediate routers to maintain multicast-related per-flow state and without requiring use of an explicit tree-building protocol. In the BIER architecture for a BIER domain, a multicast data packet enters the BIER domain at a Bit-Forwarding Ingress Router (BFIR) and leaves the BIER domain at one or more Bit-Forwarding Egress Routers (BFERs) based on use of a BIER packet header that includes a Bit-String in which each bit represents one BFER (namely, the bits of the Bit-String are set in a manner indicating the one or more BFERs to which the multicast data packet is to be provided). In general, in the BIER architecture for a BIER domain, the BIER domain may be identified by a unique BIER domain identifier and can support multiple Bit-String Lengths. In the BIER architecture for a BIER domain, the BIER routers of the BIER domain also may be referred to herein as Bit Forwarding Routers (BFRs), which are routers that participate in Bit Index Multipoint Forwarding. In the BIER architecture for a BIER domain, each BFR of the BIER domain may be configured with a BFR-ID, a BFR-Prefix that uniquely identifies the BFR in the BIER domain, a Bit String Length (BSL), a Sub-Domain (SD), a Set-Id (SI), and other parameters as defined in the BIER architecture documents. Various other aspects of the BIER architecture will be understood from the BIER architecture documents.

The BBRs 115-B may be configured to operate as ingress border routers of the BIER domain 113 and as egress border routers of the BIER domain 113, where the mode of operation being used may vary depending on the locations of the BBRs 115-B relative to the multicast hosts and the multicast sources, the type of communications being supported (e.g., multicast control traffic versus multicast data traffic), or the like, as well as various combinations thereof.

Herein, unless indicated otherwise, the terms Bit-Forwarding Ingress Router (BFIR) and Bit-Forwarding Egress Router (BFER) are used in conjunction with handling of the multicast data traffic in the data traffic direction from the MS 130 toward the MH 120. In general, the BFIR and the BFER support datapath stitching for forwarding of multicast data traffic (e.g., MPLS packets) via the BIER domain 113. In general, the BFIR and the BFER may support datapath stitching for forwarding of multicast data traffic via the BIER domain 113 based on stitching of the multicast protocol used outside of the BIER domain 113 (e.g., MPLS) to the BIER datapath within the BIER domain 113 (e.g., using BIER packets based on BIER packet headers) on the ingress and egress sides of the BIER domain 113, respectively. In general, a BFIR is the ingress border router that supports datapath stitching for forwarding of multicast data traffic based on receipt of the multicast data traffic based on MPLS, identification of a stitching forwarding entry, label handling (e.g., based on the MPLS label for the P2MP LSP within the MPLS domain 112-1 and based on the BTL of the associated P2MP LSP within the BIER domain 113), and generation of a BIER packet including setting of the BIER header fields. In general, a BFER is an egress border that is a leaf of the multicast tree and that supports datapath stitching for forwarding of multicast data traffic based on processing of the BIER header, removal of the multicast data traffic from the BIER packet, label handling (e.g., based on the BTL of the associated P2MP LSP within the BIER domain 113 and based on the MPLS label for the P2MP LSP within the MPLS domain 112-2), and forwarding of the multicast data traffic based on MPLS. In other words, the BFIR and the BFER are the BBRs from the multicast data traffic point of view. For example, in the example of FIG. 1, BBR 115-B3 would be a BFIR and BBR 115-B4 would be a BFER.

Herein, unless indicated otherwise, the terms Ingress BBR (IBBR) and Egress BBR (EBBR) are used in conjunction with handling of the multicast control messages in the control traffic direction from the MH 120 toward the MS 130. In general, an IBBR is an ingress boundary router between a MPLS domain (e.g., MPLS domain 112-2) and a BIER domain (e.g., BIER domain 113) that receives MPLS signaling including MPLS signaling information, terminates the MPLS signaling, and forwards MPLS signaling information from the MPLS signaling within the BIER domain for enabling assignment of the BTL to identify the associated P2MP LSP within the BIER domain and to enable delivery of the MPLS signaling information from the MPLS signaling to the multicast source (e.g., MS 130). In general, an EBBR is an egress boundary router between a BIER domain (e.g., BIER domain 113) and a MPLS domain (e.g., MPLS domain 112-1) that receives MPLS signaling information from the MPLS signaling terminated by an IBBR and generates corresponding MPLS signaling including the MPLS signaling information for delivery to the multicast source (e.g., MS 130) via the MPLS domain. It will be appreciated that the MPLS signaling information may include a combination of a forwarding equivalence class (FEC) and an associated action (e.g., label mapping, label withdraw, or the like) which may be denoted as <FEC, Action>. In other words, the IBBR and the EBBR are the BBRs from the control signaling point of view. For example, in the example of FIG. 1, BBR 115-B4 would be an IBBR and BBR 115-B3 would be an EBBR.

The BBRs 115-B, as discussed above, may be configured to operate as ingress border routers and as egress border routers under various conditions. As discussed above, a BFIR would be an EBBR of the control plane traffic (e.g., BBR 115-B3) and a BFER would be an IBBR of the control plane traffic (e.g., BBR 115-B4). Similarly, as discussed above, an IBBR would be a BFER of the multicast data traffic (e.g., BBR 115-B4) and an EBBR would be a BFIR of the multicast data traffic (e.g., BBR 115-B3). In other words, each of the BBRs 115-B may be configured to operate in multiple roles, for supporting control plane traffic and data traffic, under various conditions.

The BBRs 115-B, given that the BIER domain 113 is an IGP area (which corresponds to the case of IGP area 111-A) or a portion of an IGP area (which corresponds to the case of IGP area 111-S), may be area border routers (ABRs) or autonomous system border routers (ASBRs) that are connected to the edge network (e.g., MPLS routers 114) via an appropriate protocol (e.g., an IGP, a Border Gateway Protocol (BGP), or the like), provider (P) routers that are selected to operate as BIER border routers in the BIER domain 113, or the like, as well as various combinations thereof.

The BBRs 115-B, as discussed above, are configured to support datapath stitching for supporting forwarding of multicast data traffic of a multicast label switched path (e.g., MPLS packets of an LSP, such as a P2MP LSP) via the BIER domain 113. The stitching of the datapath for forwarding of multicast data traffic of a P2MP LSP via the BIER domain 113 may be based on use of a BTL to uniquely identify the P2MP LSP within the BIER domain 113. For example, the BTL may be an MPLS label that uniquely identifies a P2MP LSP within the BIER domain 113. The BTL may be assigned within the BIER domain 113 by a controller of the BIER domain 113 (an embodiment of which is presented with respect to FIG. 2), by a BBR 115-B of the BIER domain 113 (embodiments of which are presented with respect to FIG. 3 and FIG. 4), or the like, as well as various combinations thereof.

It will be appreciated that communication system 100, although primarily presented as having a specific arrangement (e.g., specific types, numbers, and arrangements of domains, routers, multicast end devices, control plane protocols, datapath protocols, and the like), may have various other arrangements (e.g., other types, numbers, or arrangements of domains, routers, multicast end devices, control plane protocols, datapath protocols, or the like, as well as various combinations thereof).

Figure 2:
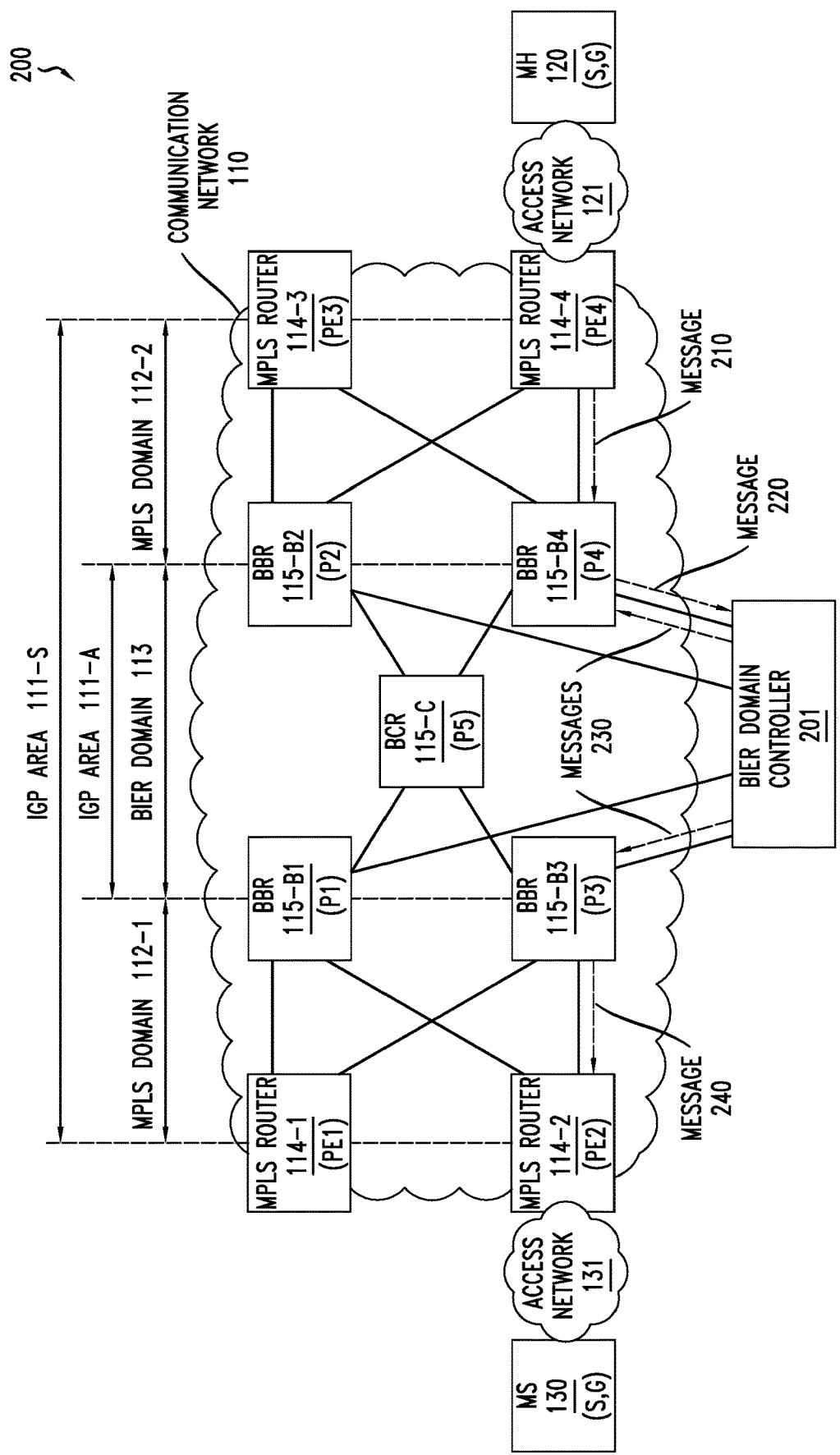
FIG. 2 depicts a communication system for illustrating assignment of a label to a P2MP LSP, for uniquely identifying the P2MP LSP within the BIER domain, by a controller of the BIER domain.

FIG. 2 depicts a communication system for illustrating assignment of a label to a P2MP LSP, for uniquely identifying the P2MP LSP within the BIER domain, by a controller of the BIER domain.

The communication system 200 of FIG. 2 is similar to the communication system 100 of FIG. 1, with the exception that the BEIR domain 113 is controlled by a BIER domain controller 201 (although it will be appreciated that such a BIER domain controller also may be used within the context of communication system 100 of FIG. 1). The BIER domain controller 201 may be an SDN controller or other suitable type of controller. In communication system 200, the BIER domain controller 201 is responsible for assigning the BTL that uniquely identifies a P2MP LSP within the BIER domain 113. A description of a process for enabling the BIER domain controller 201 to assign the BTL that uniquely identifies an MPLS P2MP LSP within the BIER domain 113 follows.

The MPLS router (illustratively, MPLS router 114-4) associated with the multicast host (illustratively, MH 120) that is requesting to join the multicast group (S,G) of the P2MP LSP, sends MPLS signaling information to an IBBR of the BIER domain (illustratively, IBBR 115-B4 of BIER domain 113) using MPLS signaling in the MPLS domain (illustratively, MPLS domain 112-2). The MPLS signaling may be an mLDP control packet or other suitable control packet. The MPLS signaling information may be a combination of a FEC and an associated action (e.g., label mapping, label withdraw, or the like) which may be denoted as <FEC, Action> for the P2MP LSP. It will be appreciated that the FEC may be a basic opaque FEC (e.g., for a single IGP area) or may be a recursive opaque FEC (e.g., for seamless MPLS). In FIG. 2, the sending of the MPLS signaling information to the IBBR of the BIER domain is indicated by message 210. For example, the message 210 may include mLDP FEC (root, opaque<lspID1>, label1), mLDP FEC (root, opaque<lspID2>, label2), or the like.

The IBBR (illustratively, the BBR 115-B4) receives the mLDP signaling packet including MPLS signaling information. The IBBR terminates the MPLS signaling and sends the MPLS signaling information of the MPLS signaling to the BIER domain controller 201. The IBBR includes its own BFR-Prefix and BFR-ID when sending the MPLS signaling information to the BIER domain controller 201. In FIG. 2, the sending of the MPLS signaling information and the BFR-Prefix of the IBBR from the IBBR to the BIER domain controller 201 is indicated by message 220. For example, the message 220 may include mLDP FEC (root, opaque<lspID1>) where message 210 includes <mLDP FEC (root, opaque<lspID1>, label1)>, mLDP FEC (root, opaque<lspID2>) where message 210 includes <mLDP FEC (root, opaque<lspID2>, label2)>, or the like.

The BIER domain controller 201 receives the MPLS signaling information and the BFR-Prefix of the IBBR from the IBBR.

The BIER domain controller 201 identifies the EBBR (illustratively, BBR 115-B3) for which the MPLS signaling was intended. The BIER domain controller 201 may identify the EBBR based on the root address of the FEC from the MPLS signaling information. In the case of a basic opaque (Type 1) FEC, the root is the root of <root, opaque<id>>. In the case of a recursive opaque FEC, the root is the outer root of <root, opaque<inner-root, opaque<id>>. The BIER domain controller 201 may identify the EBBR based on procedures defined in the draft-ietf-bier-pim-signaling document.

The BIER domain controller 201 assigns a BTL for the FEC (and, thus, for the associated P2MP LSP) from the MPLS signaling information. The BTL that is assigned may be used to uniquely identify the associated P2MP LSP within the BIER domain 113 for supporting stitching of the P2MP LSP to the BIER datapath in the BIER domain 113. The BIER domain controller 201 may assign the BTL from an overall label pool for the BIER domain 113, from an <EBBR,SD> label pool associated with the EBBR for which the MPLS signaling was intended (e.g., where the BIER domain controller 201 maintains a label pool per <EBBR, SD>, which may be used for better scalability or for other purposes), or the like.

The BIER domain controller 201 tracks each of the IBBRs of the BIER domain 113 that are receiving this FEC on the MPLS domain and would like to join this specific P2MP LSP. The BIER domain controller 201 may track the IBBRs of the BIER domain 113 that are receiving this FEC on the MPLS domain and would like to join this specific P2MP LSP by tracking the BFR-Prefixes and BFR-IDs of the IBBRs. As an example, each IBBR that receives the FEC and sends the FEC (along with its BFR-Prefix and BFR-ID) to the BIER domain controller 201 will be tracked by the BIER domain controller 201. This tracking enables the EBBR to build the correct BIER header and set the bits (in the BIER header) for all the IBBRs that are interested in the traffic from this specific P2MP LSP.

The BIER domain controller 201 updates the relevant BBRs of the BIER domain with the BTL identifying the P2MP LSP within the BIER domain 113. The relevant BBRs may include the IBBRs and the EBBR that are interested in the P2MP LSP. For example, the relevant EBBR may be the EBBR that is closest to the root node of the P2MP LSP (illustratively, BBR 115-B3) and the relevant IBBRs may include any IBBRs that have terminated the MPLS domain and extracted the FEC to the BIER domain controller 201 for the P2MP LSP (illustratively, BBR 115-B4). The BIER domain controller 201 updates the relevant BBRs with the BTL identifying the P2MP LSP by sending the MPLS signaling information and the BTL identifying the P2MP LSP to the relevant BBRs. The sending of the MPLS signaling information and the BTL identifying the P2MP LSP may be denoted as <EBBR (BFR-Prefix), SD> (BTL), <IBBR (BFR-Prefix), FEC, Action>>. The BIER domain controller 201 may send the MPLS signaling information and the BTL identifying the P2MP LSP to the relevant BBRs via downloading into the relevant BBRs. In FIG. 2, the sending of the MPLS signaling information and the BTL identifying the P2MP LSP from the BIER domain controller 201 to relevant BBRs is indicated by messages 230. For example, the messages 230 may include [<EBBR BFR-Prefix, SD> (BTL-1), <IBBR BFR-Prefix, mLDP FEC (root, opaque<lspID1>, Action>] where message 210 includes <mLDP FEC (root, opaque<lspID1>, label1)>, [<EBBR Prefix, SD> (BTL-2), <IBBR BFR-Prefix, mLDP FEC (root, opaque<lspID2>, Action>] where message 210 includes <mLDP FEC (root, opaque<lspID2>, label2)>, or the like.

The relevant EBBR (illustratively, BBR 115-B3) receives the MPLS signaling information and the BDT identifying the P2MP LSP from the BIER domain controller 201. The relevant EBBR, based on the MPLS signaling information, assigns a new outgoing label toward the root node (illustratively, MPLS router 114-2) for MPLS signaling within the MPLS domain (illustratively, MPLS domain 112-1). The relevant EBBR reconstitutes MPLS signaling and sends the MPLS signaling information to the root node using MPLS signaling. In FIG. 2, the sending of the MPLS signaling information from the relevant EBBR to the root node is indicated by message 240. For example, the message 240 may include <mLDP FEC (root, opaque<lspID1>, label3)> where message 210 includes <mLDP FEC (root, opaque<lspID1>, label1)>, <mLDP FEC (root, opaque<lspID1>, label4)> where message 210 includes <mLDP FEC (root, opaque<lspID2>, label2)>, or the like.

The relevant EBBR (illustratively, BBR 115-B3) receives the MPLS signaling information and the BDT identifying the P2MP LSP from the BIER domain controller 201. The relevant EBBR (illustratively, BBR 115-B3), based on the IBBR BFR-Prefix of the IBBR (illustratively, BBR 115-B4) which received the MPLS signaling information for the P2MP LSP, configures a stitched label forwarding entry on the relevant EBBR for the IBBR indicated by the IBBR BFR-Prefix. The stitched label forwarding entry is configured to stitch the incoming MPLS domain label for the P2MP LSP to the outgoing BTL which was uniquely assigned for the P2MP LSP by the BIER domain controller 201, with the outgoing interfaces (OIFs) being each of the IBBRs interested in the P2MP LSP (at least including the IBBR indicated by the IBBR BFR-Prefix received from the BIER domain controller 201). On the dataplane, as discussed further below, the relevant EBBR will use the BFR-Prefixes, of the IBBRs interested in the P2MP LSP in the corresponding SD, as the OIFs in order to find the corresponding BIER header bit index for each IBBR in its OIF list.

The relevant IBBR (illustratively, BBR 115-B4) receives the MPLS signaling information and the BDT identifying the P2MP LSP from the BIER domain controller 201. The relevant IBBR (illustratively, BBR 115-B4), based on the EBBR BFR-Prefix of the relevant EBBR (illustratively, BBR 115-B3) that is received, configures a stitched label forwarding entry on the relevant IBBR for the EBBR indicated by the EBBR BFR-Prefix. The stitched label forwarding entry is configured to stitch the incoming EBBR BFR-Prefix (BTL) for the P2MP LSP to the outgoing MPLS domain label for the P2MP LSP in the corresponding SD. On the dataplane, as discussed further below, the relevant IBBR will (1) use the BIER header to determine that the BIER payload is an MPLS packet and (2) remove the BIER header and use the BTL pushed by the EBBR to do a lookup in the ILM for the EBBR BFR-Prefix (BTL) for determining handling of the packet in the MPLS domain (illustratively, MPLS domain 112-2).

It will be appreciated that, while primarily presented in FIG. 2 within the context of handling of a specific type of action for the multicast tree (namely, a label mapping action in which the MPLS router 114 is joining the multicast tree), various embodiments of FIG. 2 may be adapted for use in handling other types of actions (e.g., a label withdraw action in which the MPLS router 114 is leaving the multicast tree or the like).

It will be appreciated that, while primarily presented in FIG. 2 within the context of embodiments in which the multicast datapath is provided using MPLS and the multicast control signaling is based on mLDP, various embodiments may adapted for use with other multicast datapath protocols, other multicast control signaling protocols, or the like, as well as various combinations thereof.

Figure 3:
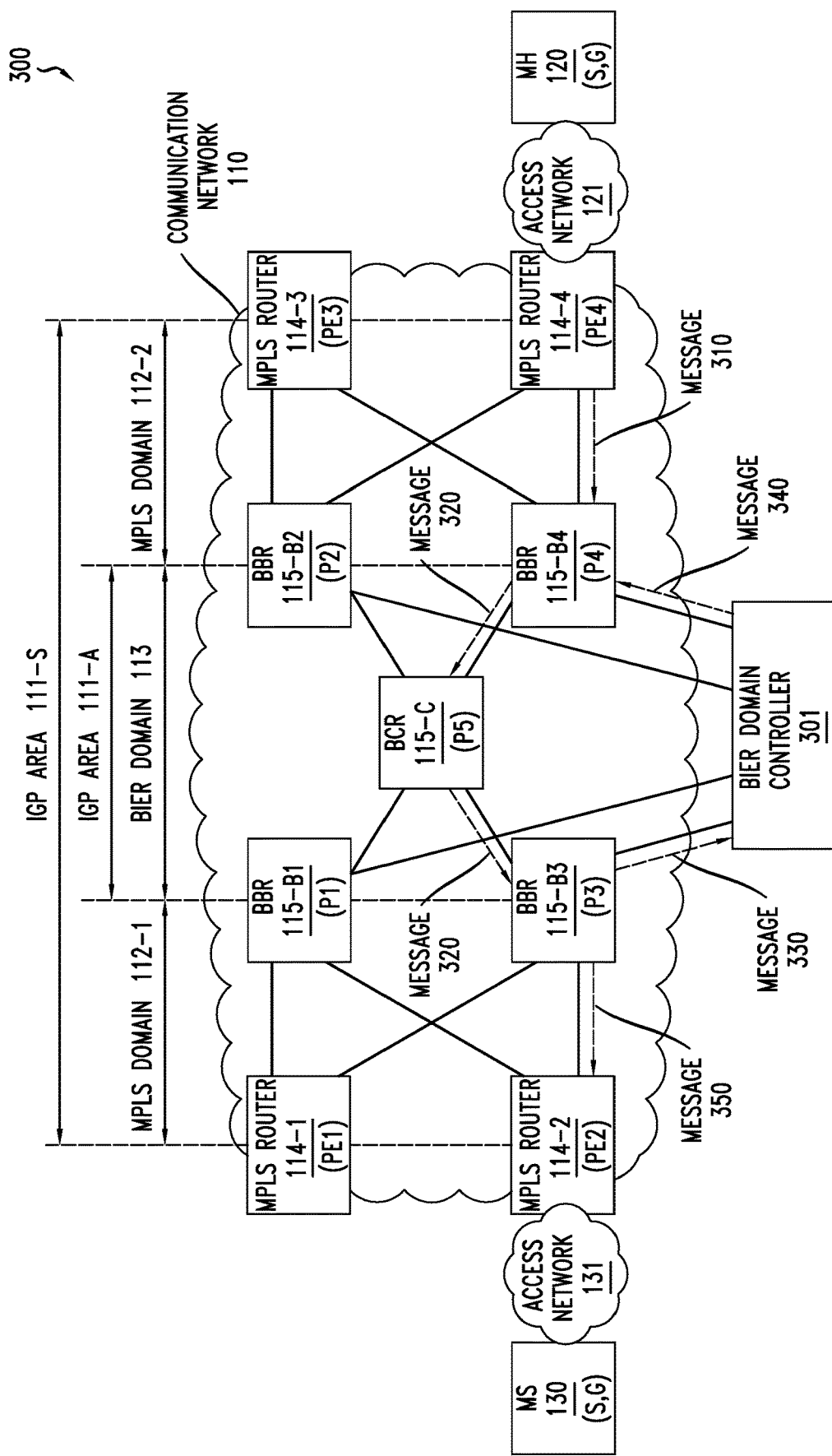
FIG. 3 depicts a communication system for illustrating assignment of a label to a P2MP LSP, for uniquely identifying the P2MP LSP within the BIER domain, by a BIER border router (BBR) of the BIER domain.

FIG. 3 depicts a communication system for illustrating assignment of a label to a P2MP LSP, for uniquely identifying the P2MP LSP within the BIER domain, by a BBR of the BIER domain.

The communication system 300 of FIG. 3 is similar to the communication system 100 of FIG. 1, with the exception that the BEIR domain 113 is controlled by a BIER domain controller 301 (although it will be appreciated that such a BIER domain controller also may be used within the context of communication system 100 of FIG. 1). The BIER domain controller 301 may be an SDN controller or other suitable type of controller. In communication system 300, an EBBR (illustratively, BBR 115-B3) is responsible for assigning the BTL that uniquely identifies a P2MP LSP within the BIER domain 113 and the BIER domain controller 301 is responsible for distributing the BTL that uniquely identifies the P2MP LSP within the BIER domain 113. A description of a process for enabling the EBBR to assign the BTL that uniquely identifies a P2MP LSP within the BIER domain 113 and for enabling the BIER domain controller 301 to distribute the BTL that uniquely identifies the P2MP LSP within the BIER domain 113 follows. The MPLS router (illustratively, MPLS router 114-4) associated with the multicast host (illustratively, MH 120) that is requesting to join the multicast group (S,G) of the P2MP LSP, sends MPLS signaling information to an IBBR of the BIER domain (illustratively, IBBR 115-B4 of BIER domain 113) using MPLS signaling in the MPLS domain (illustratively, MPLS domain 112-2). The MPLS signaling may be an mLDP signaling packet or other suitable signaling packet. The MPLS signaling information may be a combination of a FEC and an associated action (e.g., label mapping, label withdraw, or the like) which may be denoted as <FEC, Action> for the P2MP LSP. It will be appreciated that the FEC may be a basic opaque FEC (e.g., for a single IGP area) or may be a recursive opaque FEC (e.g., for seamless MPLS). In FIG. 3, the sending of the MPLS signaling information to the IBBR of the BIER domain is indicated by message 310. For example, the message 310 may be an mLDP label mapping message including mLDP FEC (root, opaque<lspID1>, label1), mLDP FEC (root, opaque<lspID2>, label2), or the like.

The IBBR (illustratively, the BBR 115-B4) receives the MPLS signaling including MPLS signaling information. The IBBR terminates the MPLS signaling, identifies the EBBR (illustratively, BBR 115-B3) for which the MPLS signaling was intended, and sends the MPLS signaling information of the MPLS signaling to the EBBR for which the MPLS signaling was intended.

The IBBR identifies the EBBR (illustratively, BBR 115-B3) for which the MPLS signaling was intended. The IBBR may identify the EBBR based on the root address of the FEC from the MPLS signaling information. In the case of a basic opaque (Type 1) FEC, the root is the root of <root, opaque<id>>. In the case of a recursive opaque FEC, the root is the outer root of <root, opaque<inner-root, opaque<id>>. The IBBR may identify the EBBR based on procedures defined in the draft-ietf-bier-pim-signaling document.

The IBBR sends the MPLS signaling information of the MPLS signaling to the EBBR for which the MPLS signaling was intended using BIER signaling. The IBBR sends the MPLS signaling information of the MPLS signaling to the EBBR for which the MPLS signaling was intended by encapsulating the MPLS signaling information of the MPLS signaling within a BIER packet, setting the BIER header to indicate routing of the BIER packet to the EBBR for which the MPLS signaling was intended (e.g., by setting the BIER header bit corresponding to the EBBR for which the MPLS signaling was intended), and forwarding the BIER packet into the BIER domain for delivery to the EBBR for which the MPLS signaling was intended. The MPLS signaling information may be encapsulated within the BIER packet by encapsulating the MPLS signaling packet (including the MPLS signaling information) within the BIER packet or by only encapsulating the MPLS signaling information (rather than the entire MPLS signaling packet) within the BIER packet. It is noted that, here, the BIER domain does not create mLDP adjacency between the two disjoint mLDP domains; rather, the BIER domain merely uses the mLDP packet for signaling purposes. In FIG. 3, the sending of the MPLS signaling information from the IBBR to the EBBR is indicated by message 320. For example, the message 320 may include mLDP FEC (root, opaque<lspID1>) where message 310 includes <mLDP FEC (root, opaque<lspID1>, label1)>, mLDP FEC (root, opaque<lspID2>) where message 310 includes <mLDP FEC (root, opaque<lspID2>, label2)>, or the like.

The EBBR receives the BIER packet including the MPLS signaling information from the IBBR. The EBBR removes the MPLS signaling information from the BIER packet and processes the MPLS signaling information.

The EBBR, based on a determination that this is the first IBBR that has forwarded the FEC to the EBBR, assigns a BTL for the FEC (and, thus, for the associated P2MP LSP) from the MPLS signaling information. The BTL that is assigned may be used to uniquely identify the associated P2MP LSP within the BIER domain 113 for supporting stitching of the P2MP LSP to the BIER datapath in the BIER domain 113. The EBBR may assign the BTL from an overall label pool for the BIER domain 113, from an <EBBR,SD> label pool associated with the EBBR (e.g., where the BIER domain controller 301 maintains a label pool per <EBBR, SD>, which may be used for better scalability or for other purposes, and distributes the per-EBBR label pools to the EBBRs, respectively), or the like. It is noted that the EBBR, based on a determination that this is not the first IBBR that has forwarded the FEC to the EBBR (but, rather, is a subsequent IBBR interested in the P2MP LSP), will add the IBBR BFR-Prefix to the OIF list of the FEC (since the EBBR will have already assigned the BTL for the FEC, as described above, when the FEC was received from the first IBBR interested in the P2MP LSP).

The EBBR sends the MPLS signaling information and the BTL identifying the P2MP LSP to the BIER domain controller 301 such that the BIER domain controller 301 may further distribute the MPLS signaling information and the BTL identifying the P2MP LSP. For example, the EBBR may create a message <<EBBR, SD> BTL, <IBBR, <FEC, Action>>, where EBBR and IBBR are the BFR-Prefixes and BFR-IDs of the EBBR and the IBBR, respectively. In FIG. 3, the sending of the MPLS signaling information and the BTL identifying the P2MP LSP from the EBBR to the BIER domain controller 301 is indicated by message 330. For example, the message 330 may include [<EBBR BFR-Prefix, BFR-ID, SD> (BTL-1), <IBBR BFR-Prefix, BFR-ID, mLDP FEC (root, opaque<lspID1>, Action>] where message 310 includes <mLDP FEC (root, opaque<lspID1>, label1)>, [<EBBR BFR-Prefix, BFR-ID, SD> (BTL-2), <IBBR BFR-Prefix, BFR-ID, mLDP FEC (root, opaque<lspID2>>] where message 310 includes <mLDP FEC (root, opaque<lspID2>, label2)>, or the like.

The BIER domain controller 301 receives the MPLS signaling information and the BTL identifying the P2MP LSP from the EBBR (illustratively, BBR 115-B3). The BIER domain controller 301 sends the MPLS signaling information and the BTL identifying the P2MP LSP to IBBRs of the BIER domain 113, which may include all of the IBBRs of the BIER domain 113 or IBBRs of the BIER domain 113 that are relevant to the P2MP LSP. The relevant IBBRs may include any IBBRs that have terminated the MPLS domain and extracted the FEC to the BIER domain controller 301 for the P2MP LSP (illustratively, BBR 115-B4). The sending of the MPLS signaling information and the BTL identifying the P2MP LSP may be denoted as <EBBR (BFR-Prefix, BFR- ID), SD> (BTL), <IBBR (BFR-Prefix, BFR-ID), FEC, Action>>. The BIER domain controller 301 may send the MPLS signaling information and the BTL identifying the P2MP LSP to IBBRs via downloading into the IBBRs. In FIG. 3, the sending of the MPLS signaling information and the BTL identifying the P2MP LSP from the BIER domain controller 301 to relevant IBBRs is indicated by message 340. For example, the message 340 may include [<EBBR BFR-Prefix, BFR-ID, SD> (BTL-1), <IBBR BFR-Prefix, BFR-ID, mLDP FEC (root, opaque<lspID1>, Action>] where message 310 includes <mLDP FEC (root, opaque<lspID1>, label1)>, [<EBBR BFR-Prefix, SD> (BTL-2), <IBBR BFR-Prefix, mLDP FEC (root, opaque<lspID2>>] where message 310 includes <mLDP FEC (root, opaque<lspID2>, label2)>, or the like.

The relevant IBBR (illustratively, BBR 115-B4) receives the MPLS signaling information and the BDT identifying the P2MP LSP from the BIER domain controller 301. The relevant IBBR (illustratively, BBR 115-B4), based on the EBBR BFR-Prefix of the relevant EBBR (illustratively, BBR 115-B3) that is received, configures a stitched label forwarding entry on the relevant IBBR for the EBBR indicated by the EBBR BFR-Prefix. The stitched label forwarding entry is configured to stitch the incoming EBBR BFR-Prefix (BTL) for the P2MP LSP to the outgoing MPLS domain label for the P2MP LSP. On the dataplane, as discussed further below, the relevant IBBR will look at the BIER header protocol and, if the BIER header protocol is MPLS, will remove the BIER header and use the BTL under the BIER header to do a lookup in ILM for the EBBR BFR-Prefix (BTL) for determining handling of the packet in the MPLS domain (illustratively, MPLS domain 112-2).

The EBBR (illustratively, BBR 115-B3), in addition to assigning the BTL for the FEC from the MPLS signaling information, uses the IBBR BFR-Prefix, of the IBBR (illustratively, BBR 115-B4) which received the MPLS signaling information for the P2MP LSP, to configure a new stitched label forwarding entry on the EBBR, where the stitched label forwarding entry is configured to stitch the incoming MPLS domain label for the P2MP LSP to the outgoing BTL for the P2MP LSP, with the output interfaces (OIFs) being each of the IBBRs interested in the P2MP LSP. On the dataplane, as discussed further below, the EBBR will use the BFR-Prefixes of the IBBRs interested in the P2MP LSP as the OIFs in order to find the corresponding BIER header bit index for each IBBR in its OIF list.

The EBBR (illustratively, BBR 115-B3), in addition to assigning the BTL for the FEC from the MPLS signaling information, assigns a new outgoing label toward the root node (illustratively, MPLS router 114-2) for MPLS signaling within the MPLS domain (illustratively, MPLS domain 112-1). The EBBR reconstitutes MPLS signaling and sends the MPLS signaling information to the root node using MPLS signaling. In FIG. 3, the sending of the MPLS signaling information from the EBBR to the root node is indicated by message 350. For example, the message 350 may include <mLDP FEC (root, opaque<lspID1>, label3)> where message 310 includes <mLDP FEC (root, opaque<lspID1>, label1)>, <mLDP FEC (root, opaque<lspID1>, label4)> where message 310 includes <mLDP FEC (root, opaque<lspID2>, label2)>, or the like.

It will be appreciated that, while primarily presented in FIG. 3 within the context of handling of a specific type of action for the multicast tree (namely, a label mapping action in which the MPLS router 114 is joining the multicast tree), various embodiments of FIG. 3 may be adapted for use in handling other types of actions (e.g., a label withdraw action in which the MPLS router 114 is leaving the multicast tree or the like).

It will be appreciated that, while primarily presented in FIG. 3 within the context of embodiments in which the multicast datapath is provided using MPLS and the multicast control signaling is based on mLDP, various embodiments may adapted for use with other multicast datapath protocols, other multicast control signaling protocols, or the like, as well as various combinations thereof.

Figure 4:
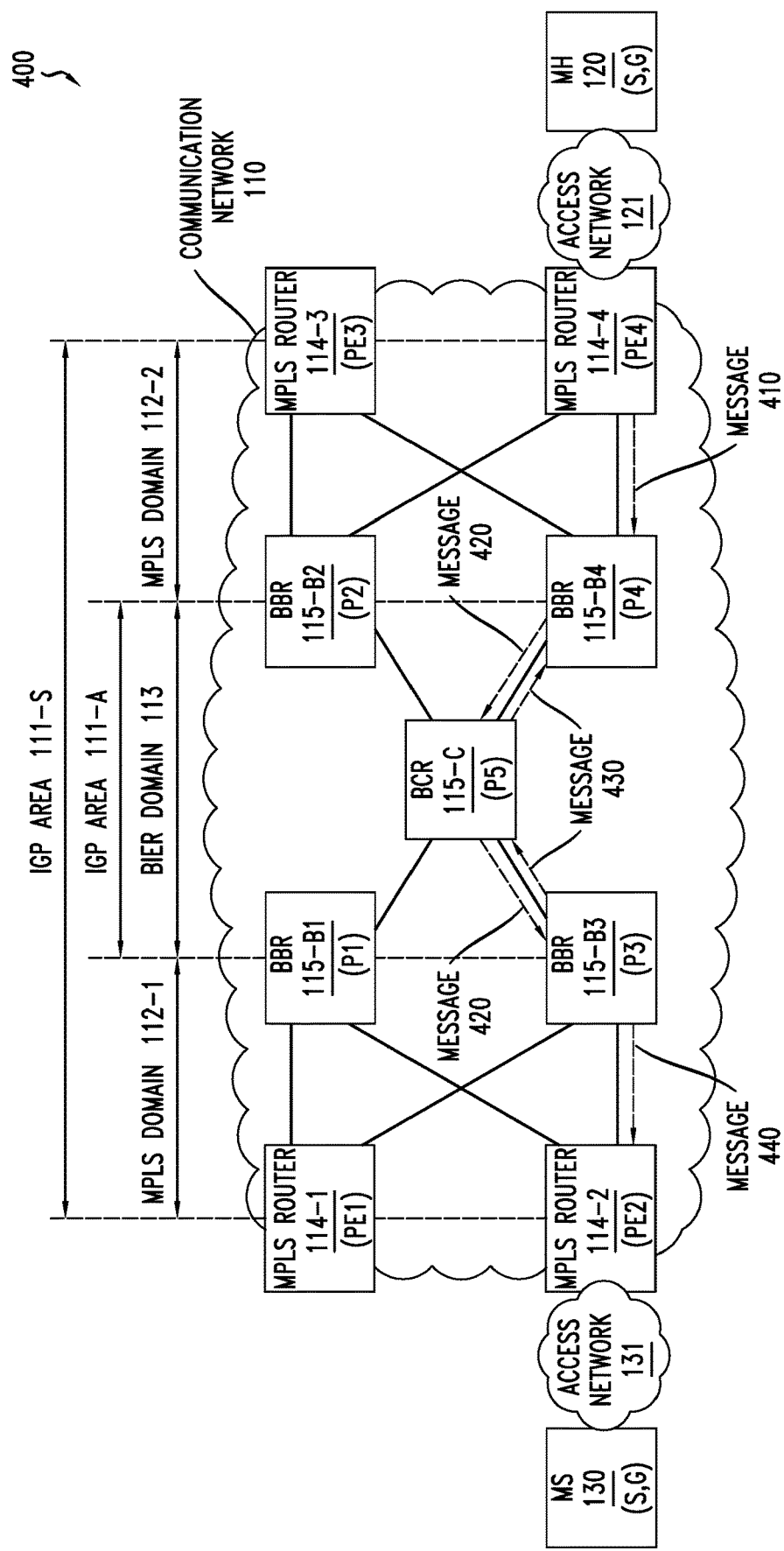
FIG. 4 depicts a communication system for illustrating assignment of a label to a P2MP LSP, for uniquely identifying the P2MP LSP within the BIER domain, by a BIER border router (BBR) of the BIER domain.

FIG. 4 depicts a communication system for illustrating assignment of a label to a P2MP LSP, for uniquely identifying the P2MP LSP within the BIER domain, by a BBR of the BIER domain.

The communication system 400 of FIG. 4 is similar to the communication system 100 of FIG. 1. It will be appreciated that, although omitted for purposes of clarity, the communication system 400 may include a BIER domain controller configured to control elements of the BIER domain 113 (e.g., an SDN controller or other suitable type of controller. In communication system 400, an EBBR (illustratively, BBR 115-B3) is responsible for assigning the BTL that uniquely identifies a P2MP LSP within the BIER domain 113 and for distributing the BTL that uniquely identifies the P2MP LSP within the BIER domain 113. A description of a process for enabling the EBBR to assign the BTL that uniquely identifies a P2MP LSP within the BIER domain 113 and for enabling the EBBR to distribute the BTL that uniquely identifies the P2MP LSP within the BIER domain 113 follows.

The MPLS router (illustratively, MPLS router 114-4) associated with the multicast host (illustratively, MH 120) that is requesting to join the multicast group (S,G) of the P2MP LSP, sends MPLS signaling information to an IBBR of the BIER domain (illustratively, IBBR 115-B4 of BIER domain 113) using MPLS signaling in the MPLS domain (illustratively, MPLS domain 112-2). The MPLS signaling may be mLDP signaling packet or other suitable signaling packet. The MPLS signaling information may be a combination of a FEC and an associated action (e.g., label mapping, label withdraw, or the like) which may be denoted as <FEC, Action> for the P2MP LSP. It will be appreciated that the FEC may be a basic opaque FEC (e.g., for a single IGP area) or may be a recursive opaque FEC (e.g., for seamless MPLS). In FIG. 4, the sending of the MPLS signaling information to the IBBR of the BIER domain is indicated by message 410. For example, the message 310 may include mLDP FEC (root, opaque<lspID1>, label1), mLDP FEC (root, opaque<lspID2>, label2), or the like.

The IBBR (illustratively, the BBR 115-B4) receives the MPLS signaling including MPLS signaling information. The IBBR terminates the MPLS signaling, identifies the EBBR (illustratively, BBR 115-B3) for which the MPLS signaling was intended, and sends the MPLS signaling information of the MPLS signaling to the EBBR for which the MPLS signaling was intended.

The IBBR identifies the EBBR (illustratively, BBR 115-B3) for which the MPLS signaling was intended. The IBBR may identify the EBBR based on the root address of the FEC from the MPLS signaling information. In the case of a basic opaque (Type 1) FEC, the root is the root of <root, opaque<id>>. In the case of a recursive opaque FEC, the root is the outer root of <root, opaque<inner-root, opaque<id>>. The IBBR may identify the EBBR based on procedures defined in the draft-ietf-bier-pim-signaling document.

The IBBR sends the MPLS signaling information of the MPLS signaling to the EBBR for which the MPLS signaling was intended using BIER signaling. The IBBR sends the MPLS signaling information of the MPLS signaling to the EBBR for which the MPLS signaling was intended by encapsulating the MPLS signaling information of the MPLS signaling within a BIER packet, setting the BIER header to indicate routing of the BIER packet to the EBBR for which the MPLS signaling was intended (e.g., by setting the BIER header bit corresponding to the EBBR for which the MPLS signaling was intended), and forwarding the BIER packet into the BIER domain for delivery to the EBBR for which the MPLS signaling was intended. The MPLS signaling information may be encapsulated within the BIER packet by encapsulating the MPLS signaling packet (including the MPLS signaling information) within the BIER packet or by only encapsulating the MPLS signaling information (rather than the entire MPLS signaling packet) within the BIER packet. It is noted that, here, the BIER domain does not create mLDP adjacency between the two disjoint mLDP domains; rather, the BIER domain merely uses the mLDP packet for signaling purposes. In FIG. 4, the sending of the MPLS signaling information from the IBBR to the EBBR is indicated by message 420. For example, the message 420 may include mLDP FEC (root, opaque<lspID1>) where message 410 includes <mLDP FEC (root, opaque<lspID1>, label1)>, mLDP FEC (root, opaque<lspID2>) where message 410 includes <mLDP FEC (root, opaque<lspID2>, label2)>, or the like.

The EBBR receives the BIER packet including the MPLS signaling information from the IBBR. The EBBR removes the MPLS signaling information from the BIER packet and processes the MPLS signaling information.

The EBBR, based on a determination that this is the first IBBR that has forwarded the FEC to the EBBR, assigns a BTL for the FEC (and, thus, for the associated P2MP LSP) from the MPLS signaling information. The BTL that is assigned may be used to uniquely identify the associated P2MP LSP within the BIER domain 113 for supporting stitching of the P2MP LSP to the BIER datapath in the BIER domain 113. The EBBR may assign the BTL from an overall label pool for the BIER domain 113, from an <EBBR,SD> label pool associated with the EBBR (e.g., where the BIER domain controller 301 maintains a label pool per <EBBR, SD>, which may be used for better scalability or for other purposes, and distributes the per-EBBR label pools to the EBBRs, respectively), or the like. It is noted that the EBBR, based on a determination that this is not the first IBBR that has forwarded the FEC to the EBBR (but, rather, is a subsequent IBBR interested in the P2MP LSP), will add the IBBR BFR-Prefix to the OIF list of the FEC (since the EBBR will have already assigned the BTL for the FEC, as described above, when the FEC was received from the first IBBR interested in the P2MP LSP).

The EBBR sends the MPLS signaling information and the BTL identifying the P2MP LSP to the IBBR from which the MPLS signaling information was received (namely, BBR 115-B4). The EBBR may send the MPLS signaling information and the BTL identifying the P2MP LSP to the IBBR from which the MPLS signaling information was received based on a Multiprotocol-Border Gateway Protocol (MP-BGP) adjacency to the IBBR from which the MPLS signaling information was received (e.g., based on a P-Multicast Service Interface (PMSI) Tunnel Attribute (PTA) and Network Layer Reachability Information (NLRI)). The EBBR may send the MPLS signaling information and the BTL identifying the P2MP LSP to the IBBR from which the MPLS signaling information was received based on a BGP Multicast Virtual Private Network (MVPN). The EBBR may send the MPLS signaling information and the BTL identifying the P2MP LSP to the IBBR from which the MPLS signaling information was received based on Segment Routing-Traffic Engineering (SR-TE). In FIG. 4, the sending of the MPLS signaling information and the BTL identifying the P2MP LSP from the EBBR to the IBBR from which the MPLS signaling information was received is indicated by message 430. For example, the message 430 may include [<EBBR BFR-Prefix, SD> (BTL-1), <IBBR BFR-Prefix, mLDP FEC (root, opaque<lspID1>>] where message 410 includes <mLDP FEC (root, opaque<lspID1>, label1)>, [<EBBR BFR-Prefix, SD> (BTL-2), <IBBR BFR-Prefix, mLDP FEC (root, opaque<lspID2>>] where message 410 includes <mLDP FEC (root, opaque<lspID2>, label2)>, or the like.

The relevant IBBR (illustratively, BBR 115-B4) receives the MPLS signaling information and the BDT identifying the P2MP LSP from the EBBR. The relevant IBBR (illustratively, BBR 115-B4), based on the EBBR BFR-Prefix of the relevant EBBR (illustratively, BBR 115-B3) that is received, configures a stitched label forwarding entry on the relevant IBBR for the EBBR indicated by the EBBR BFR-Prefix. The stitched label forwarding entry is configured to stitch the incoming EBBR BFR-Prefix (BTL) for the P2MP LSP to the outgoing MPLS domain label for the P2MP LSP. On the dataplane, as discussed further below, the relevant IBBR will look at the BIER header protocol and, if the BIER header protocol is MPLS, will perform a lookup in the ILM for the EBBR BFR-Prefix (BTL) for determining handling of the packet in the MPLS domain (illustratively, MPLS domain 112-2).

The EBBR (illustratively, BBR 115-B3), in addition to assigning the BTL for the FEC from the MPLS signaling information, uses the IBBR BFR-Prefix, of the IBBR (illustratively, BBR 115-B4) which received the MPLS signaling information for the P2MP LSP, to configure a new stitched label forwarding entry on the EBBR, where the stitched label forwarding entry is configured to stitch the incoming MPLS domain label for the P2MP LSP to the outgoing BTL for the P2MP LSP, with the output interfaces (OIFs) being each of the IBBRs interested in the P2MP LSP. On the dataplane, as discussed further below, the EBBR will use the BFR-Prefixes of the IBBRs interested in the P2MP LSP as the OIFs in order to find the corresponding BIER header bit index for each IBBR in its OIF list.

The EBBR (illustratively, BBR 115-B3), in addition to assigning the BTL for the FEC from the MPLS signaling information, assigns a new outgoing label toward the root node (illustratively, MPLS router 114-2) for MPLS signaling within the MPLS domain (illustratively, MPLS domain 112-1). The EBBR reconstitutes MPLS signaling and sends the MPLS signaling information to the root node using MPLS signaling. In FIG. 4, the sending of the MPLS signaling information from the EBBR to the root node is indicated by message 440. For example, the message 440 may include <mLDP FEC (root, opaque<lspID1>, label3)> where message 410 includes <mLDP FEC (root, opaque<lspID1>, label1)>, <mLDP FEC (root, opaque<lspID1>, label4)> where message 410 includes <mLDP FEC (root, opaque<lspID2>, label2)>, or the like.

It will be appreciated that, while primarily presented in FIG. 4 within the context of handling of a specific type of action for the multicast tree (namely, a label mapping action in which the MPLS router 114 is joining the multicast tree), various embodiments of FIG. 4 may be adapted for use in handling other types of actions (e.g., a label withdraw action in which the MPLS router 114 is leaving the multicast tree or the like).

It will be appreciated that, while primarily presented in FIG. 4 within the context of embodiments in which the multicast datapath is provided using MPLS and the multicast control signaling is based on mLDP, various embodiments may adapted for use with other multicast datapath protocols, other multicast control signaling protocols, or the like, as well as various combinations thereof.

Figure 5:
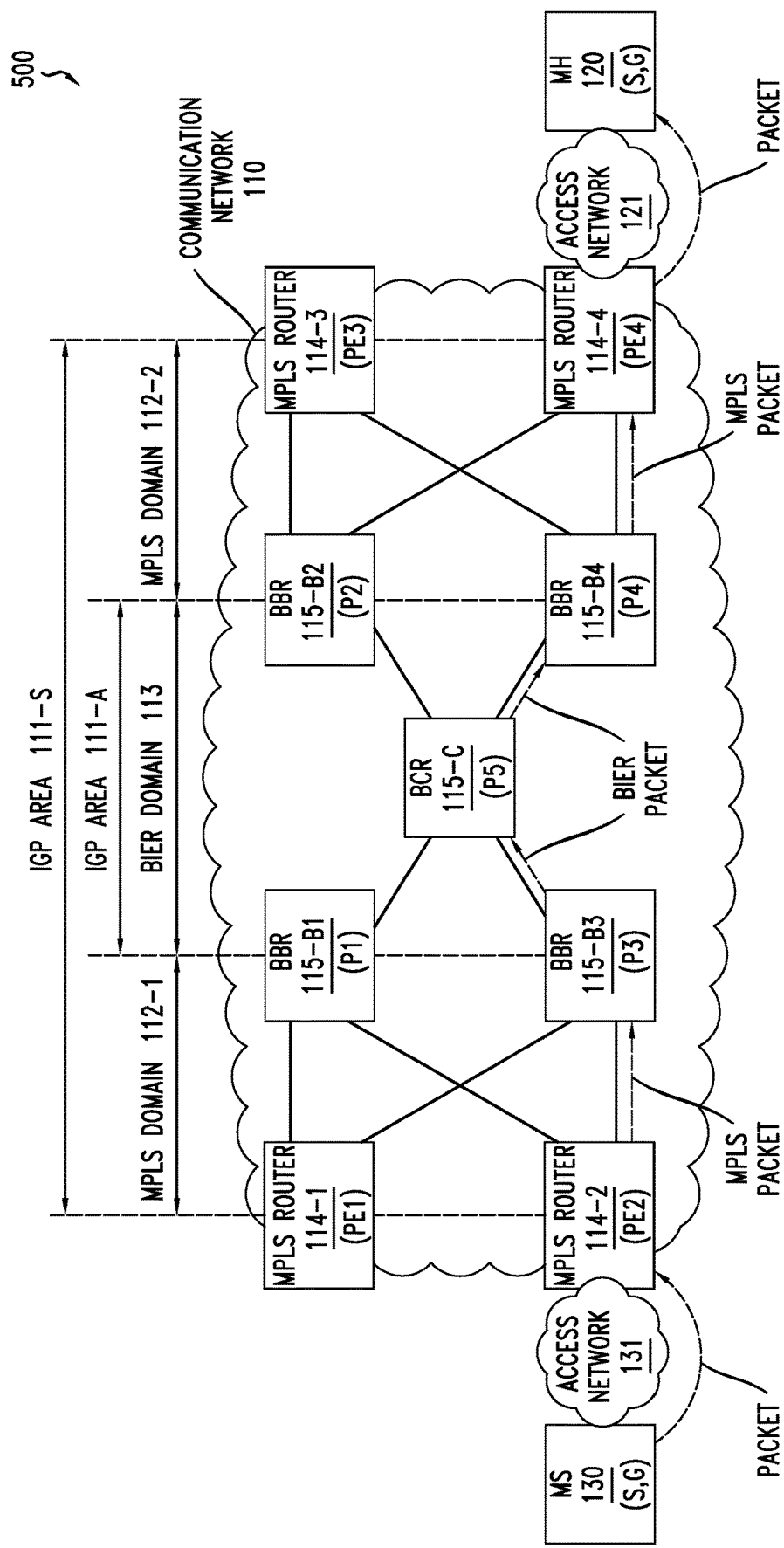
FIG. 5 depicts a communication system for illustrating transport of MPLS packets of a P2MP LSP across a BIER domain based on assignment of a label to the P2MP LSP for uniquely identifying the P2MP LSP within the BIER domain.

FIG. 5 depicts a communication system for illustrating transport of MPLS packets of a P2MP LSP across a BIER domain based on assignment of a label to the P2MP LSP for uniquely identifying the P2MP LSP within the BIER domain.

The communication system 500 of FIG. 5 is similar to the communication system 100 of FIG. 1. In communication system 500, a BTL has been assigned to a P2MP LSP for uniquely identifying the P2MP LSP within the BIER domain 113. A description of a process for routing a multicast packet via the P2MP LSP across the BIER domain 113 based on the BTL assigned to the P2MP LSP (e.g., assigned as presented with respect to any of FIGS. 2-4) follows. In this example, for purposes of clarity, it is assumed that only the MH 120 is part of the multicast group.

The multicast source (illustratively, MS 130) sends an MPLS packet to a multicast group (e.g., multicast group (S, G)) that includes a multicast host (illustratively, MH 120). It will be appreciated that the multicast group may include other multicast hosts; however, for purposes of clarity, routing of the MPLS packet to MH 120 is presented. The multicast source provides the MPLS packet to its associated MPLS router (illustratively, MPLS router 114-2 communicatively connected to MS 130 via access network 131).

The MPLS router (illustratively, MPLS router 114-2) associated with the multicast source (illustratively, MS 130) receives the MPLS packet from the multicast source and sends the MPLS packet to the associated BFIR of the multicast tree for the multicast group (illustratively, BBR 115-B3) via the associated MPLS domain (illustratively, MPLS domain 112-1). The MPLS packet is routed via the MPLS domain based on an MPLS label for the P2MP LSP within the MPLS domain.

The BFIR of the multicast tree for the multicast group (illustratively, BBR 115-B3) receives the MPLS packet via the associated MPLS domain (illustratively, MPLS domain 112-1).

The BFIR performs a lookup based on the MPLS label of the MPLS packet to identify the BTL for the P2MP LSP within the BIER domain. The BFIR may perform the lookup to identify the BTL for the P2MP LSP within the BIER domain in the ILM table of the BFIR.

The BFIR replaces the MPLS label for the P2MP LSP within the MPLS domain with the BTL for the P2MP LSP within the BIER domain (e.g., by swapping the MPLS label with the BTL, by popping the MPLS label and pushing the BTL, or the like).

The BFIR encapsulates the MPLS packet within a BIER header to form a BIER packet and forwards the BIER packet into the BIER domain. The BFIR identifies IBBRs of the BIER domain that belong to the multicast group and, thus, are interested in the P2MP LSP for the multicast group. The BFIR may identify IBBRs of the BIER domain that belong to the multicast group by checking the outgoing interface list of the BTL for the P2MP LSP (which includes a list of the BFR-Prefixes and BFR-IDs of the IBBRs that belong to the multicast group for the P2MP LSP). The BFIR sets the BIER Bit Index of the BIER header in a manner that indicates each of the BBRs of the BIER domain identified as belonging to the multicast group. The BFIR sets the BIER Header Protocol field in a manner that indicates the protocol of the packet being transported by the BIER packet in the BIER domain (e.g., BIERHeader.Proto=MPLS since the packet is an MPLS packet entering the BIER domain 113 from MPLS domain 112-1). The BFIR may set other fields of the BIER header. The BFIR forwards the BIER packet into the BIER domain within the corresponding SD for transporting the MPLS packet across the SD based on stitching of the MPLS P2MP LSP and the BIER datapath.

The BIER domain uses BIER forwarding procedures (e.g., based on RFC 8279) to provide the BIER packet to each of the IBBRs that belong to the multicast group (illustratively, BBR 115-B4, which is the IBBR for the multicast group).

The IBBRs of the BIER domain that correspond to the same SD and that are interested in the P2MP LSP (illustratively, BBR 115-B4 which is the EBBR for MH 120) receive the BIER packet. The IBBR that is identified is the BFER of the BIER datapath for the P2MP LSP. The BFER that receives the BIER packet checks the protocol of the BIER header (in this example, BIERHeader.Proto=MPLS). The BFER that receives the BIER packet performs a lookup based on the BFR-ID of the BIER packet to identify the EBBR label pool base for the BIER packet. The BFER that receives the BIER packet removes the BIER header of the BIER packet and performs a lookup based on the EBBR BFR-Prefix (BTL) to identify the MPLS label for the P2MP LSP within the MPLS domain (illustratively, MPLS domain 112-2). The BFER may perform the lookup to identify the MPLS label for the P2MP LSP within the MPLS domain in the ILM table (e.g., the ILM table for the EBBR BFR-Prefix (BTL)) of the BFER.

The BFER replaces the BTL for the P2MP LSP within the BIER domain with the MPLS label for the P2MP LSP within the MPLS domain (e.g., by swapping the BTL with the MPLS label, by popping the BTL and pushing the MPLS label, or the like).

The BFER forwards the MPLS packet to each of the MPLS OIFs on the BFER such that the MPLS packet is delivered to each of the MPLS routers serving multicast hosts that belong to the multicast group (illustratively, for delivery to MPLS router 114-4 that serves MH 120).

The MPLS router that serves the multicast host belonging to the multicast group (illustratively, MPLS router 114-4 that serves MH 120) receives the MPLS and forwards the MPLS packet toward the multicast host (illustratively, toward MH 120 via associate access network 121).

It will be appreciated that, while primarily presented in FIG. 5 within the context of embodiments in which the multicast datapath is provided using MPLS, various embodiments may adapted for use with other multicast datapath protocols.

FIG. 6 depicts an example embodiment of a method for use by an IBBR for supporting assignment of a label to a P2MP LSP within a BIER domain for uniquely identifying the P2MP LSP within the BIER domain. It will be appreciated that, although primarily presented herein as being performed serially, at least a portion of the functions of method 600 may be performed contemporaneously or in a different order than as presented in FIG. 6. At block 601, method 600 begins. At block 610, receive, by a BBR of a BIER domain from an MPLS domain, MPLS signaling information associated with a P2MP LSP. At block 620, send, by the BBR toward a device configured to assign a BTL identifying the P2MP LSP within the BIER domain, the MPLS signaling information associated with the P2MP LSP. At block 699, method 600 ends. It will be appreciated that various other functions presented herein as being supported by IBBRs (e.g., as presented in FIGS. 1-5) may be performed within the context of method 600 of FIG. 6 or using one or more other methods which may be performed in conjunction with or independent of method 600 of FIG. 6.

Figure 7:
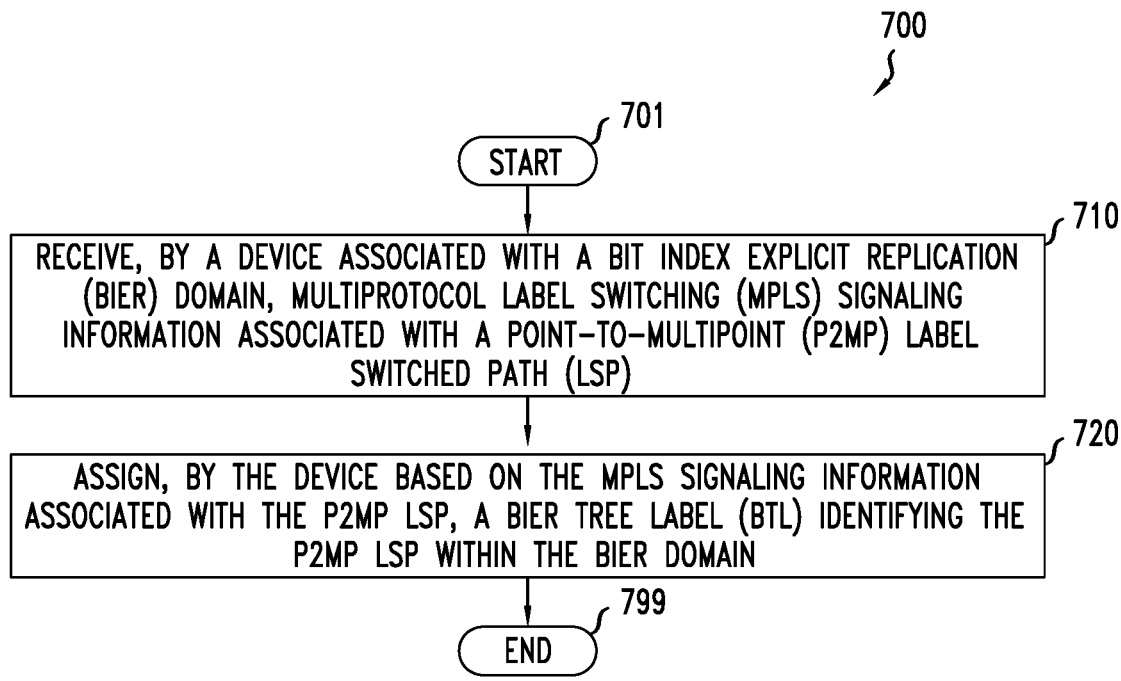
FIG. 7 depicts an example embodiment of a method for use by a BTL assigning node for supporting assignment of a label to a P2MP LSP within a BIER domain for uniquely identifying the P2MP LSP within the BIER domain.

FIG. 7 depicts an example embodiment of a method for use by a BTL assigning node for supporting assignment of a label to a P2MP LSP within a BIER domain for uniquely identifying the P2MP LSP within the BIER domain. It will be appreciated that, although primarily presented herein as being performed serially, at least a portion of the functions of method 700 may be performed contemporaneously or in a different order than as presented in FIG. 7. At block 701, method 700 begins. At block 710, receive, by a device associated with a BIER domain, MPLS signaling information associated with a P2MP LSP. At block 720, assign, by the device based on the MPLS signaling information associated with the P2MP LSP, a BTL identifying the P2MP LSP within the BIER domain. At block 799, method 700 ends. It will be appreciated that various other functions presented herein as being supported by BDT assigning entities (e.g., as presented in FIGS. 1-5) may be performed within the context of method 700 of FIG. 7 or using one or more other methods which may be performed in conjunction with or independent of method 700 of FIG. 7.

FIG. 8 depicts an example embodiment of a method for use by an EBBR for supporting assignment of a label to a P2MP LSP within a BIER domain for uniquely identifying the P2MP LSP within the BIER domain. It will be appreciated that, although primarily presented herein as being performed serially, at least a portion of the functions of method 800 may be performed contemporaneously or in a different order than as presented in FIG. 8. At block 801, method 800 begins. At block 810, obtain, by a BBR of a BIER domain, a BTL identifying a P2MP LSP within the BIER domain. The BTL identifying a P2MP LSP within the BIER domain may be obtained by receiving the BTL identifying a P2MP LSP within the BIER domain, assigning the BTL identifying a P2MP LSP within the BIER domain, or the like. At block 899, method 800 ends. It will be appreciated that various other functions presented herein as being supported by EBBRs (e.g., as presented in FIGS. 1-5) may be performed within the context of method 800 of FIG. 8 or using one or more other methods which may be performed in conjunction with or independent of method 800 of FIG. 8.

It will be appreciated that, although embodiments for supporting MPLS-based multicast via a BIER domain are primarily presented herein within the context of a specific type of multicast explicit replication domain (e.g., BIER), specific types of multicast protocols (e.g., MPLS) supporting specific types of multicast label switched paths (e.g., P2MP LSPs) based on specific types of multicast signaling protocols (e.g., mLDP), various embodiments for supporting MPLS-based multicast via a BIER domain may be provided in conjunction with other types of multicast explicit replication domains, other types of multicast protocols, other types of multicast label switched paths, other types of multicast signaling protocols, or the like, as well as various combinations thereof.

FIG. 9 depicts an example embodiment of a method for use by border router of a multicast explicit replication domain for supporting assignment of a label to a multicast label switched path within the multicast explicit replication domain for uniquely identifying the multicast label switched path within the multicast explicit replication domain. It will be appreciated that, although primarily presented herein as being performed serially, at least a portion of the functions of method 900 may be performed contemporaneously or in a different order than as presented in FIG. 9. At block 901, method 900 begins. At block 910, receive, by a border router of a multicast explicit replication domain from a multicast label switching domain, multicast signaling information associated with a multicast label switched path. At block 920, send, by the border router toward a device configured to assign a tree label identifying the multicast label switched path within the multicast explicit replication domain, the multicast signaling information associated with the multicast label switched path. At block 999, method 900 ends. It will be appreciated that method 600 of FIG. 6 may correspond to an embodiment of method 900 of FIG. 9 in which the multicast explicit replication domain is a BIER domain, the multicast label switching domain is an MPLS domain, the multicast signaling information is MPLS signaling information, the multicast label switched path is a P2MP LSP, and the tree label is a BDT for the P2MP LSP within the BIER domain.

Figure 10:
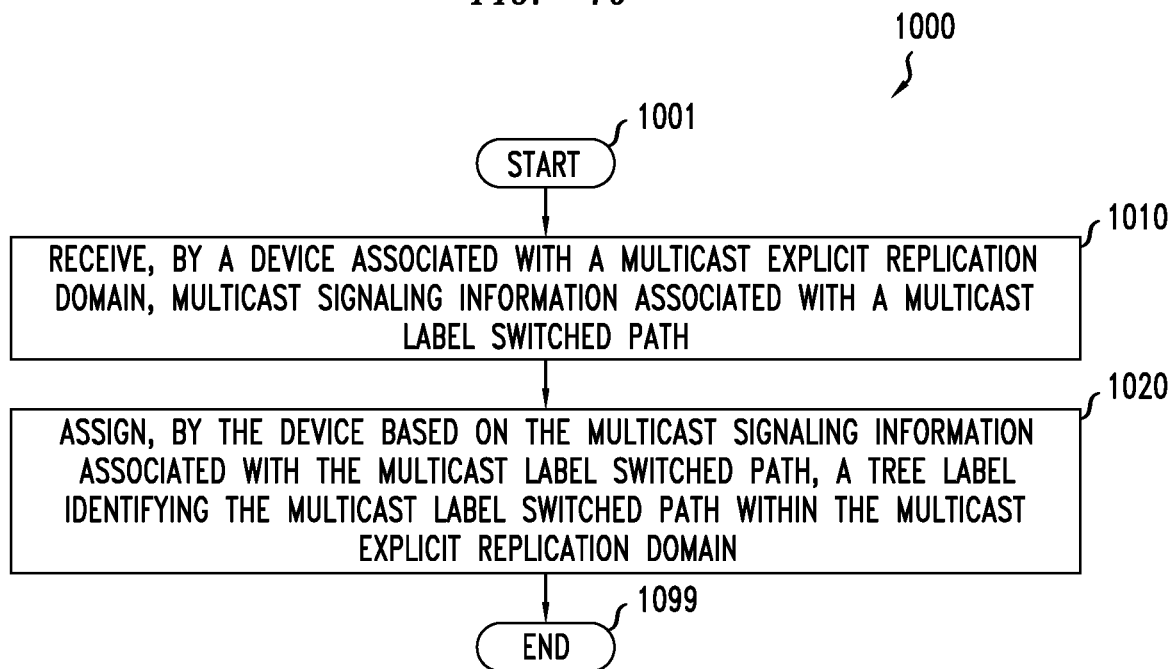
FIG. 10 depicts an example embodiment of a method for use by an assigning node of a multicast explicit replication domain for supporting assignment of a label to a multicast label switched path within the multicast explicit replication domain for uniquely identifying the multicast label switched path within the multicast explicit replication domain.

FIG. 10 depicts an example embodiment of a method for use by an assigning node of a multicast explicit replication domain for supporting assignment of a label to a multicast label switched path within the multicast explicit replication domain for uniquely identifying the multicast label switched path within the multicast explicit replication domain. It will be appreciated that, although primarily presented herein as being performed serially, at least a portion of the functions of method 1000 may be performed contemporaneously or in a different order than as presented in FIG. 10. At block 1001, method 1000 begins. At block 1010, receive, by a device associated with a multicast explicit replication domain, multicast signaling information associated with a multicast label switched path. At block 1020, assign, by the device based on the multicast signaling information associated with the multicast label switched path, a tree label identifying the multicast label switched path within the multicast explicit replication domain. At block 1099, method 1000 ends. It will be appreciated that method 700 of FIG. 7 may correspond to an embodiment of method 1000 of FIG. 10 in which the multicast explicit replication domain is a BIER domain, the multicast signaling information is MPLS signaling information, the multicast label switched path is a P2MP LSP, and the tree label is a BDT for the P2MP LSP within the BIER domain.

FIG. 11 depicts an example embodiment of a method for use by a border router of a multicast explicit replication domain for supporting assignment of a label to a multicast label switched path within the multicast explicit replication domain for uniquely identifying the multicast label switched path within the multicast explicit replication domain. It will be appreciated that, although primarily presented herein as being performed serially, at least a portion of the functions of method 1100 may be performed contemporaneously or in a different order than as presented in FIG. 11. At block 1101, method 1100 begins. At block 1110, obtain, by a border router of a multicast explicit replication domain, a tree label identifying a multicast label switched path within the multicast explicit replication domain. At block 1199, method 1100 ends. It will be appreciated that method 800 of FIG. 8 may correspond to an embodiment of method 1100 of FIG. 11 in which the multicast explicit replication domain is a BIER domain, the multicast label switched path is a P2MP LSP, and the tree label is a BDT for the P2MP LSP within the BIER domain.

Various embodiments for supporting MPLS-based multicast via a BIER domain may provide various advantages or potential advantages. Various embodiments for supporting MPLS-based multicast via a BIER domain may be configured to enable a network provider to deploy BIER in some segments of the network while retaining legacy multicast technology in other segments of the network. Various embodiments for supporting MPLS-based multicast via a BIER domain may provide various other advantages or potential advantages.

Figure 12:
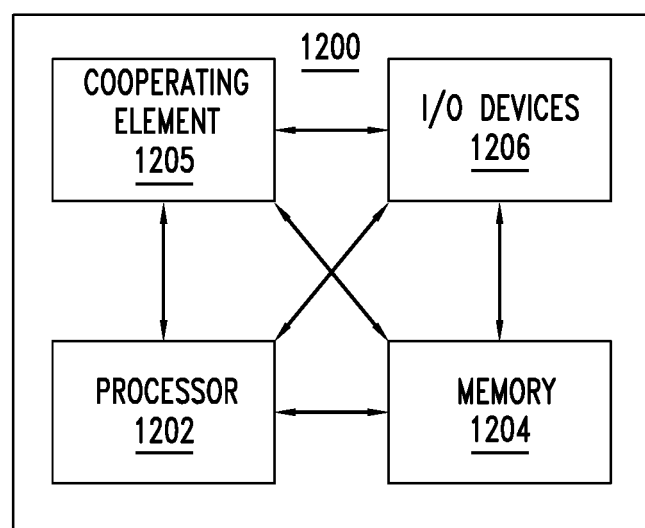
FIG. 12 depicts a high-level block diagram of a computer suitable for use in performing various functions presented herein.

FIG. 12 depicts a high-level block diagram of a computer suitable for use in performing various functions described herein.

The computer 1200 includes a processor 1202 (e.g., a central processing unit (CPU), a processor having a set of one or more processor cores, or the like) and a memory 1204 (e.g., a random access memory (RAM), a read only memory (ROM), or the like). The processor 1202 and the memory 1204 are communicatively connected.

The computer 1200 also may include a cooperating element 1205. The cooperating element 1205 may be a hardware device. The cooperating element 1205 may be a process that can be loaded into the memory 1204 and executed by the processor 1202 to implement functions as discussed herein (in which case, for example, the cooperating element 1205 (including associated data structures) can be stored on a non-transitory computer-readable storage medium, such as a storage device or other storage element (e.g., a magnetic drive, an optical drive, or the like)).

The computer 1200 also may include one or more input/output devices 1206. The input/output devices 1206 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 1200 of FIG. 12 may represent a general architecture and functionality suitable for implementing functional elements described herein, portions of functional elements described herein, or the like, as well as various combinations thereof. For example, computer 1200 may provide a general architecture and functionality that is suitable for implementing one or more of an MPLS router 114, a BIER router 115, MH 120, MS 130, BIER domain controller 201, BIER domain controller 301, or the like, as well as various combinations thereof.

It will be appreciated that various functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including a set of instructions;
   wherein the set of instructions is configured to, when executed by the at least one processor, cause the apparatus to at least:
      receive, by a controller associated with a multicast explicit replication domain, multicast signaling information associated with a multicast label switched path; and
      assign, by the controller based on the multicast signaling information associated with the multicast label switched path, a tree label identifying the multicast label switched path within the multicast explicit replication domain.

2. The apparatus of claim 1, wherein the multicast signaling information is received from an ingress boundary router of the multicast explicit replication domain.

3. The apparatus of claim 1, wherein the multicast signaling information is received in a signaling packet of the multicast explicit replication domain.

4. The apparatus of claim 1, wherein the multicast signaling information includes a forwarding equivalence class and an action.

5. The apparatus of claim 1, wherein the set of instructions is configured to, when executed by the at least one processor, cause the apparatus to at least:
   send, from the device toward one or more border routers of the multicast explicit replication domain interested in the multicast label switched path, the tree label identifying the multicast label switched path within the multicast explicit replication domain.

6. The apparatus of claim 5, wherein the one or more border routers of the multicast explicit replication domain interested in the multicast label switched path include a border router of the multicast explicit replication domain from which the multicast signaling information is received and a border router of multicast explicit replication domain at which packets of the multicast label switched path enter the multicast explicit replication domain.

7. The apparatus of claim 1, wherein the set of instructions is configured to, when executed by the at least one processor, cause the apparatus to at least:
   assign, by the controller, a label identifying the multicast label switched path within a multicast domain supported by the multicast explicit replication domain; and
   send, by the controller toward a root of the multicast label switched path via the multicast domain, the label identifying the multicast label switched path within the multicast domain supported by the multicast explicit replication domain.

8. The apparatus of claim 1, wherein the multicast explicit replication domain comprises a Bit Index Explicit Replication (BIER) domain and the tree label comprises a BIER tree label (BTL).

9. The apparatus of claim 1, wherein the multicast signaling information comprises Multiprotocol Label Switching (MPLS) signaling information and the multicast label switched path comprises a point-to-multipoint (P2MP) label switched path (LSP).

10. An apparatus, comprising:
at least one processor; and
at least one memory including a set of instructions;
wherein the set of instructions is configured to, when executed by the at least one processor, cause the apparatus to at least:
receive, by a border router of a multicast explicit replication domain from a multicast domain, a packet of a multicast label switched path, wherein the packet includes a multicast label identifying the multicast label switched path within the multicast domain;
perform, by the border router, a modification of the packet to form a modified packet, wherein the modification of the packet to form the modified packet includes removing the multicast label identifying the multicast label switched path within the multicast domain and including a tree label identifying the multicast label switched path within the multicast explicit replication domain; and
send, by the border router toward the multicast explicit replication domain, the modified packet.

11. The apparatus of claim 10, wherein, to send the modified packet, the set of instructions is configured to, when executed by the at least one processor, cause the apparatus to at least:
encapsulate the modified packet within a header of the multicast explicit replication domain to form a multicast explicit replication domain packet; and
send the multicast explicit replication domain packet toward a router of the multicast explicit replication domain.

12. The apparatus of claim 11, wherein the header includes a bit string having a set of bit positions set in a manner indicative of a set of egress nodes of the multicast explicit replication domain to which the multicast explicit replication domain packet is to be provided.

13. The apparatus of claim 10, wherein the set of instructions is configured to, when executed by the at least one processor, cause the apparatus to at least:
receive, by the border router of the multicast explicit replication domain, the tree label identifying the multicast label switched path within the multicast explicit replication domain.

14. The apparatus of claim 13, wherein the tree label identifying the multicast label switched path within the multicast explicit replication domain is received from a controller of the multicast explicit replication domain.

15. The apparatus of claim 10, wherein the set of instructions is configured to, when executed by the at least one processor, cause the apparatus to at least:
receive, by the border router of the multicast explicit replication domain, multicast signaling information associated with a multicast label switched path; and
assign, by the border router of the multicast explicit replication domain based on the multicast signaling information associated with the multicast label switched path, the tree label identifying the multicast label switched path within the multicast explicit replication domain.

16. The apparatus of claim 10, wherein the multicast explicit replication domain comprises a Bit Index Explicit Replication (BIER) domain and the tree label comprises a BIER tree label (BTL).

17. The apparatus of claim 10, wherein the multicast domain comprises a Multiprotocol Label Switching (MPLS) domain, wherein the multicast label comprises an MPLS label.

18. An apparatus, comprising:
at least one processor; and
at least one memory including a set of instructions;
wherein the set of instructions is configured to, when executed by the at least one processor, cause the apparatus to at least:
receive, by a border router of a multicast explicit replication domain associated with a multicast domain, a multicast explicit replication domain packet including a packet of a multicast label switched path, wherein the packet of the multicast label switched path includes a tree label identifying the multicast label switched path within the multicast explicit replication domain;
perform, by the border router, a modification of the packet of the multicast label switched path to form a modified packet, wherein the modification of the packet of the multicast label switched path includes removing the tree label identifying the multicast label switched path within the multicast explicit replication domain and adding a multicast label identifying the multicast label switched path within the multicast domain; and
send, by the border router toward the multicast domain, the modified packet.

19. The apparatus of claim 18, wherein the multicast explicit replication domain packet encapsulates the packet of the multicast label switched path with a header that includes a bit string having a set of bit positions set in a manner indicative of a set of egress nodes of the multicast explicit replication domain to which the multicast explicit replication domain packet is to be provided.

20. The apparatus of claim 19, wherein the packet of the multicast label switched path is extracted from the multicast explicit replication domain packet based on a determination that one of the bits in the bit string is set in a manner indicative that the border router is one of the egress nodes of multicast explicit replication domain to which the multicast explicit replication domain packet is to be provided.

21. The apparatus of claim 18, wherein the set of instructions is configured to, when executed by the at least one processor, cause the apparatus to at least:
receive, by the border router of the multicast explicit replication domain, the tree label identifying the multicast label switched path within the multicast explicit replication domain.

22. The apparatus of claim 21, wherein the tree label identifying the multicast label switched path within the multicast explicit replication domain is received from a controller of the multicast explicit replication domain.

23. The apparatus of claim 18, wherein the multicast explicit replication domain comprises a Bit Index Explicit Replication (BIER) domain and the tree label comprises a BIER tree label (BTL).

24. The apparatus of claim 18, wherein the multicast domain comprises a Multiprotocol Label Switching (MPLS) domain, wherein the multicast label comprises an MPLS label.

* * * * *